(12) United States Patent
Bhogal et al.

(10) Patent No.: US 12,253,268 B1
(45) Date of Patent: Mar. 18, 2025

(54) APPLIANCE WITH GASEOUS COLLOID MANAGEMENT SYSTEM AND METHOD OF USE

(71) Applicant: June Life, LLC, San Francisco, CA (US)

(72) Inventors: Nikhil Bhogal, San Francisco, CA (US); Matthew Van Horn, San Francisco, CA (US)

(73) Assignee: June Life, LLC, San Francisco, CA (US)

( * ) Notice: Subject to any disclaimer, the term of this patent is extended or adjusted under 35 U.S.C. 154(b) by 0 days.

(21) Appl. No.: 18/142,375

(22) Filed: May 2, 2023

Related U.S. Application Data

(63) Continuation of application No. 17/948,045, filed on Sep. 19, 2022, now abandoned, which is a
(Continued)

(51) Int. Cl.
| | |
|---|---|
| *F24C 7/08* | (2006.01) |
| *A23L 5/10* | (2016.01) |
| *A47J 37/06* | (2006.01) |
| *F24C 3/12* | (2006.01) |
| *F24C 15/00* | (2006.01) |
| *F24C 15/20* | (2006.01) |
| *H04W 4/80* | (2018.01) |

(Continued)

(52) U.S. Cl.
CPC ............... *F24C 7/086* (2013.01); *A23L 5/15* (2016.08); *A23L 5/17* (2016.08); *A47J 37/0664* (2013.01); *F24C 3/124* (2013.01); *F24C 7/085* (2013.01); *F24C 7/087* (2013.01); *F24C 15/008* (2013.01); *F24C 15/2021* (2013.01); *H04W 4/80* (2018.02); *H05B 1/0263* (2013.01); *A23L 5/10* (2016.08); *F24C 7/062* (2013.01); *F24C 15/003* (2013.01); *F24C 15/2007* (2013.01)

(58) Field of Classification Search
CPC .......... F24C 3/124; F24C 7/087; F24C 7/085; F24C 7/062; F24C 7/086; A23L 5/10; A23L 5/15; A23L 5/17
USPC ........................................... 99/331
See application file for complete search history.

(56) References Cited

U.S. PATENT DOCUMENTS

| | | |
|---|---|---|
| 3,453,997 A | 7/1969 | Klepzig |
| 3,911,893 A | 10/1975 | Baker et al. |

(Continued)

FOREIGN PATENT DOCUMENTS

| | | |
|---|---|---|
| CN | 1900858 A | 1/2007 |
| CN | 101044362 A | 9/2007 |

(Continued)

OTHER PUBLICATIONS

U.S. Appl. No. 12/216,999, filed Jul. 14, 2008, Kim, et al.
(Continued)

*Primary Examiner* — Avinash A Savani
(74) *Attorney, Agent, or Firm* — Banner & Witcoff, Ltd.

(57) ABSTRACT

A method including: during a colloid cooking period, cooking food using a gaseous colloid and sampling a cavity measurement. The method can optionally include transmitting the sampled measurements to a remote computing system; automatically cooking food according to adjusted colloid cooking parameters determined based on the measurement; and/or other processes.

21 Claims, 10 Drawing Sheets

Related U.S. Application Data continuation of application No. 16/268,296, filed on Feb. 5, 2019, now abandoned, which is a continuation-in-part of application No. 16/008,478, filed on Jun. 14, 2018, now Pat. No. 10,801,734, which is a continuation of application No. 15/450,546, filed on Mar. 6, 2017, now Pat. No. 10,024,544, which is a continuation of application No. 15/147,597, filed on May 5, 2016, now Pat. No. 9,644,847.

(60) Provisional application No. 62/626,651, filed on Feb. 5, 2018, provisional application No. 62/157,325, filed on May 5, 2015.

(51) Int. Cl.
  *H05B 1/02* (2006.01)
  *F24C 7/06* (2006.01)

(56) References Cited

U.S. PATENT DOCUMENTS

| | | |
|---|---|---|
| 4,158,432 A | 6/1979 | Van |
| 4,177,369 A | 12/1979 | Fritts |
| 4,363,957 A | 12/1982 | Tachikawa et al. |
| 4,415,790 A | 11/1983 | Diesch et al. |
| 4,430,540 A | 2/1984 | Scalf |
| 4,447,692 A | 5/1984 | Mierzwinski |
| 4,568,810 A | 2/1986 | Carmean |
| 4,591,684 A | 5/1986 | Tanabe et al. |
| 4,625,086 A | 11/1986 | Karino |
| 5,005,123 A | 4/1991 | Mierzwinski |
| 5,044,262 A | 9/1991 | Burkett et al. |
| 5,154,940 A | 10/1992 | Budzyna et al. |
| 5,170,024 A | 12/1992 | Hanatani et al. |
| 5,360,965 A | 11/1994 | Ishii et al. |
| 5,361,681 A | 11/1994 | Hedstroem et al. |
| 5,412,448 A | 5/1995 | Kunishige |
| 5,498,856 A | 3/1996 | Carlsson |
| 5,520,095 A | 5/1996 | Huber et al. |
| 5,546,475 A | 8/1996 | Bolle et al. |
| 5,609,095 A | 3/1997 | Lemke et al. |
| 5,663,758 A | 9/1997 | Linville |
| 5,918,589 A | 7/1999 | Valle et al. |
| 5,981,916 A | 11/1999 | Griffiths et al. |
| 6,011,242 A | 1/2000 | Westerberg |
| 6,060,701 A | 5/2000 | McKee et al. |
| 6,299,921 B1 | 10/2001 | Loeffler et al. |
| 6,310,964 B1 | 10/2001 | Mohan et al. |
| 6,359,270 B1 | 3/2002 | Bridson |
| 6,384,384 B1 | 5/2002 | Connolly et al. |
| 6,486,453 B1 | 11/2002 | Bales et al. |
| 6,759,635 B2 | 7/2004 | Lile |
| 6,789,067 B1 | 9/2004 | Liebenow |
| 6,821,016 B2 | 11/2004 | Sato et al. |
| 6,856,247 B1 | 2/2005 | Wallace |
| 6,862,494 B2 | 3/2005 | Hu et al. |
| 7,013,661 B2 | 3/2006 | Gatling et al. |
| 7,102,107 B1 | 9/2006 | Chapman |
| 7,150,891 B2 | 12/2006 | Greiner et al. |
| 7,445,381 B2 | 11/2008 | Rund et al. |
| 7,516,692 B2 | 4/2009 | Pirkle et al. |
| 7,566,168 B2 | 7/2009 | Rund et al. |
| 7,663,502 B2 | 2/2010 | Breed |
| 7,845,823 B2 | 12/2010 | Mueller et al. |
| 7,973,642 B2 | 7/2011 | Schackmuth et al. |
| 8,091,543 B2 | 1/2012 | Baumann et al. |
| 8,193,474 B2 | 6/2012 | Harris |
| 8,426,777 B2 | 4/2013 | Elston et al. |
| 8,555,776 B2 | 10/2013 | Debord et al. |
| 8,766,144 B2 | 7/2014 | McLoughlin et al. |
| 8,931,400 B1 | 1/2015 | Allen |
| 9,017,751 B2 | 4/2015 | Rauh |
| 9,041,799 B2 | 5/2015 | Bielstein |
| 9,069,340 B2 | 6/2015 | Minvielle |
| 9,149,058 B2 | 10/2015 | Bilet et al. |
| 9,414,444 B2 | 8/2016 | Libman et al. |
| 9,432,561 B2 | 8/2016 | Samuels et al. |
| 9,460,633 B2 | 10/2016 | Minvielle |
| 9,494,322 B2 | 11/2016 | Luckhardt et al. |
| 9,528,972 B2 | 12/2016 | Minvielle |
| 9,564,064 B2 | 2/2017 | Minvielle |
| 9,644,847 B2 | 5/2017 | Bhogal et al. |
| 9,664,436 B1 | 5/2017 | Hall et al. |
| 9,791,206 B1 | 10/2017 | Hall et al. |
| 9,927,129 B2 | 3/2018 | Bhogal et al. |
| 9,933,166 B2 | 4/2018 | Matarazzi et al. |
| 10,024,544 B2 | 7/2018 | Bhogal et al. |
| 10,024,736 B2 | 7/2018 | Nivala et al. |
| 10,057,946 B2 | 8/2018 | Mills et al. |
| 10,092,129 B2 | 10/2018 | Jenkins et al. |
| 10,207,734 B2 | 2/2019 | Watanabe |
| 10,559,186 B2 | 2/2020 | Allen |
| 10,739,013 B2 | 8/2020 | Bhogal |
| 10,801,734 B2 | 10/2020 | Bhogal et al. |
| 10,845,060 B2 | 11/2020 | Bhogal et al. |
| 10,852,005 B2 | 12/2020 | Faraldi et al. |
| 11,116,050 B1 | 9/2021 | Bhogal et al. |
| 2002/0005406 A1 | 1/2002 | Fukunaga et al. |
| 2003/0047553 A1 | 3/2003 | Patti et al. |
| 2003/0139843 A1 | 7/2003 | Hu et al. |
| 2004/0104222 A1 | 6/2004 | Lee |
| 2005/0046584 A1 | 3/2005 | Breed |
| 2005/0047134 A1 | 3/2005 | Mueller et al. |
| 2005/0133019 A1 | 6/2005 | Kim et al. |
| 2005/0193901 A1 | 9/2005 | Buehler |
| 2005/0211104 A1 | 9/2005 | Harris et al. |
| 2006/0185523 A1 | 8/2006 | Wiedemann et al. |
| 2006/0218057 A1 | 9/2006 | Fitzpatrick et al. |
| 2006/0219234 A1 | 10/2006 | Larsen |
| 2007/0001012 A1 | 1/2007 | Kim et al. |
| 2007/0007279 A1 | 1/2007 | Chun et al. |
| 2007/0029306 A1 | 2/2007 | Chun et al. |
| 2007/0042091 A1 | 2/2007 | Rund et al. |
| 2007/0125760 A1 | 6/2007 | Kim et al. |
| 2007/0215599 A1 | 9/2007 | Kahler |
| 2008/0029078 A1 | 2/2008 | Baumann et al. |
| 2008/0032018 A1 | 2/2008 | Garniss et al. |
| 2008/0043809 A1 | 2/2008 | Herbert |
| 2008/0110999 A1 | 5/2008 | Jerovsek |
| 2008/0120188 A1 | 5/2008 | Mobley et al. |
| 2008/0193614 A1 | 8/2008 | Greiner et al. |
| 2008/0274240 A1 | 11/2008 | Germouni et al. |
| 2009/0134151 A1 | 5/2009 | Bogatin et al. |
| 2009/0255920 A1 | 10/2009 | Bonassi et al. |
| 2009/0274805 A1 | 11/2009 | Schonemann |
| 2010/0006558 A1 | 1/2010 | McLoughlin et al. |
| 2010/0021606 A1 | 1/2010 | Rauh |
| 2010/0066824 A1 | 3/2010 | Burton |
| 2010/0124378 A1 | 5/2010 | Das et al. |
| 2010/0134620 A1 | 6/2010 | Bielstein |
| 2010/0138075 A1 | 6/2010 | Boer et al. |
| 2010/0140248 A1 | 6/2010 | Yi et al. |
| 2010/0145483 A1 | 6/2010 | McGonagle et al. |
| 2010/0147823 A1 | 6/2010 | Anderson et al. |
| 2010/0320189 A1 | 12/2010 | Buchheit |
| 2011/0002677 A1 | 1/2011 | Cochran et al. |
| 2011/0022211 A1 | 1/2011 | McIntyre et al. |
| 2011/0081471 A1 | 4/2011 | McLemore et al. |
| 2011/0123689 A1 | 5/2011 | Luckhardt et al. |
| 2011/0127252 A1 | 6/2011 | Yu et al. |
| 2011/0253693 A1 | 10/2011 | Lyons et al. |
| 2011/0284518 A1 | 11/2011 | Elston et al. |
| 2012/0017882 A1 | 1/2012 | Kitaguchi et al. |
| 2012/0027904 A1 | 2/2012 | Lim |
| 2012/0038549 A1 | 2/2012 | Mandella et al. |
| 2012/0076351 A1 | 3/2012 | Yoon et al. |
| 2012/0099761 A1 | 4/2012 | Yoon et al. |
| 2012/0100269 A1 | 4/2012 | Polt |
| 2012/0125921 A1 | 5/2012 | Shim et al. |
| 2012/0157696 A1 | 6/2012 | Chopra et al. |
| 2012/0170247 A1 | 7/2012 | Do |
| 2012/0241445 A1 | 9/2012 | Shim et al. |
| 2012/0288595 A1 | 11/2012 | Randall et al. |

(56) References Cited

U.S. PATENT DOCUMENTS

| | | | |
|---|---|---|---|
| 2013/0052310 A1 | 2/2013 | Stanford | |
| 2013/0084369 A1 | 4/2013 | Smrke | |
| 2013/0092680 A1 | 4/2013 | Cartwright et al. | |
| 2013/0092682 A1 | 4/2013 | Mills et al. | |
| 2013/0112683 A1 | 5/2013 | Hegedis et al. | |
| 2013/0171304 A1 | 7/2013 | Huntley | |
| 2013/0176116 A1 | 7/2013 | Jung et al. | |
| 2013/0186887 A1 | 7/2013 | Hallgren et al. | |
| 2013/0206752 A1 | 8/2013 | Moon et al. | |
| 2013/0269539 A1 | 10/2013 | Polt | |
| 2013/0277353 A1 | 10/2013 | Joseph et al. | |
| 2013/0284728 A1 | 10/2013 | Moon et al. | |
| 2013/0302483 A1 | 11/2013 | Riefenstein | |
| 2013/0306052 A1 | 11/2013 | Price et al. | |
| 2013/0306627 A1 | 11/2013 | Libman et al. | |
| 2014/0026762 A1 | 1/2014 | Riefenstein | |
| 2014/0039650 A1 | 2/2014 | Baraille et al. | |
| 2014/0086274 A1 | 3/2014 | Henke | |
| 2014/0190961 A1 | 7/2014 | Kanzaki et al. | |
| 2014/0199455 A1 | 7/2014 | Bilet et al. | |
| 2014/0203012 A1 | 7/2014 | Corona et al. | |
| 2014/0242227 A1 | 8/2014 | Yang et al. | |
| 2014/0297467 A1 | 10/2014 | Soller et al. | |
| 2014/0334691 A1 | 11/2014 | Cho et al. | |
| 2015/0037472 A1 | 2/2015 | Fung et al. | |
| 2015/0056344 A1 | 2/2015 | Luckhardt | |
| 2015/0136760 A1 | 5/2015 | Lima et al. | |
| 2015/0170000 A1 | 6/2015 | Yang et al. | |
| 2015/0285513 A1 | 10/2015 | Matarazzi et al. | |
| 2015/0289324 A1 | 10/2015 | Rober et al. | |
| 2015/0292749 A1 | 10/2015 | Kim et al. | |
| 2015/0324074 A1 | 11/2015 | Van Winkle | |
| 2016/0063734 A1 | 3/2016 | Divakaran et al. | |
| 2016/0098465 A1 | 4/2016 | Wu et al. | |
| 2016/0242240 A1 | 8/2016 | Lee et al. | |
| 2016/0273778 A1 | 9/2016 | Son et al. | |
| 2016/0278563 A1 | 9/2016 | Choudhary | |
| 2016/0283822 A1 | 9/2016 | Imai et al. | |
| 2016/0296055 A1 | 10/2016 | Schilling | |
| 2016/0302265 A1 | 10/2016 | Kreiner | |
| 2016/0327279 A1 | 11/2016 | Bhogal et al. | |
| 2016/0327281 A1 | 11/2016 | Bhogal et al. | |
| 2017/0011649 A1 | 1/2017 | Lee et al. | |
| 2017/0074522 A1 | 3/2017 | Cheng | |
| 2017/0116661 A1 | 4/2017 | Sundaram | |
| 2017/0132950 A1 | 5/2017 | Harrison | |
| 2017/0150842 A1 | 6/2017 | Young et al. | |
| 2017/0176019 A1 | 6/2017 | Bhogal et al. | |
| 2017/0188741 A1 | 7/2017 | Thomas et al. | |
| 2017/0208652 A1 | 7/2017 | Luckhardt et al. | |
| 2017/0224161 A1 | 8/2017 | Li et al. | |
| 2017/0332841 A1 | 11/2017 | Reischmann | |
| 2018/0101608 A1 | 4/2018 | Thysell | |
| 2018/0184668 A1 | 7/2018 | Stork Genannt Wersborg | |
| 2018/0292093 A1 | 10/2018 | Bhogal et al. | |
| 2018/0299138 A1 | 10/2018 | Faraldi et al. | |
| 2018/0324908 A1 | 11/2018 | Denker et al. | |
| 2019/0110638 A1 | 4/2019 | Li et al. | |
| 2019/0200652 A1 | 7/2019 | Jellema et al. | |
| 2019/0234617 A1 | 8/2019 | Bhogal et al. | |
| 2019/0250043 A1 | 8/2019 | Wu et al. | |
| 2019/0354810 A1 | 11/2019 | Samel et al. | |
| 2019/0387926 A1* | 12/2019 | Shei | A47J 27/14 |
| 2020/0063978 A1 | 2/2020 | Erbe et al. | |
| 2020/0069103 A1 | 3/2020 | Baldwin et al. | |
| 2020/0088412 A1 | 3/2020 | Bhogal et al. | |
| 2020/0096203 A1 | 3/2020 | Bhogal et al. | |
| 2020/0103120 A1 | 4/2020 | Bhogal et al. | |
| 2020/0182480 A1 | 6/2020 | Bhogal et al. | |
| 2020/0182481 A1 | 6/2020 | Bhogal et al. | |
| 2020/0253415 A1* | 8/2020 | Stork genannt Wersborg | H05B 6/6447 |
| 2020/0292177 A1 | 9/2020 | Bhogal et al. | |
| 2020/0300479 A1 | 9/2020 | Chadwick et al. | |
| 2020/0400317 A1 | 12/2020 | Bhogal et al. | |
| 2021/0102708 A1 | 4/2021 | Bhogal et al. | |
| 2021/0131669 A1 | 5/2021 | Bhogal et al. | |
| 2021/0148577 A1 | 5/2021 | Bhogal et al. | |

FOREIGN PATENT DOCUMENTS

| | | |
|---|---|---|
| CN | 101504158 A | 8/2009 |
| CN | 201353794 Y | 12/2009 |
| CN | 202392848 U | 8/2012 |
| CN | 103234228 A | 8/2013 |
| CN | 103501618 A | 1/2014 |
| CN | 103592227 A | 2/2014 |
| CN | 104042124 A | 9/2014 |
| CN | 203914599 U | 11/2014 |
| CN | 104246375 A | 12/2014 |
| DE | 19828333 A1 | 12/1999 |
| DE | 102005030483 A1 | 1/2007 |
| DE | 202008000135 | 3/2008 |
| DE | 102008043722 A1 | 5/2010 |
| DE | 102012204229 A1 | 9/2013 |
| DE | 102017220884 A1 | 5/2019 |
| EP | 0298858 A1 | 1/1989 |
| EP | 0899512 A1 | 3/1999 |
| EP | 1179711 A1 | 2/2002 |
| EP | 1746350 A2 | 1/2007 |
| EP | 2149755 A1 | 2/2010 |
| EP | 2515044 A1 | 10/2012 |
| EP | 2618634 A1 | 7/2013 |
| GB | 1163509 A | 9/1969 |
| GB | 1195750 A | 6/1970 |
| JP | 11-63509 | 3/1999 |
| JP | 2004187778 A | 7/2004 |
| JP | 2005276171 A | 10/2005 |
| JP | 201353794 | 3/2013 |
| WO | 2006128696 A1 | 12/2006 |
| WO | 2007022507 A2 | 2/2007 |
| WO | 2009012874 A2 | 1/2009 |
| WO | 2013167333 A1 | 11/2013 |
| WO | 2014086486 A2 | 6/2014 |
| WO | 2014086487 A1 | 6/2014 |
| WO | 2015059931 A1 | 4/2015 |
| WO | 2019232113 A1 | 12/2019 |

OTHER PUBLICATIONS

U.S. Appl. No. 13/059,486, filed Aug. 26, 2009, Sakane, et al.
U.S. Appl. No. 13/978,413, filed Apr. 19, 2012, Ruther.
U.S. Appl. No. 14/205,587, filed Mar. 12, 2014, Chadwick, et al.
U.S. Appl. No. 14/205,593, filed Mar. 12, 2014, Chadwick, et al.
U.S. Appl. No. 15/510,544, filed Oct. 9, 2015, Kondo, et al.
"Automated Fruit Recognition for Super Markets and Food Stores, Fraunhofer", http://www.iosb.fraunhofer.de/servlet/s/33328/, accessed online Nov. 13, 2014.
"Colloids, Gels and Suspensions", https://kitchenscience.scitoys.com/Gels (c) 2021 included as "Colloids_Gels_and_Suspensions_Your_Mother_Was_A_Chemist.pdf", 2021.
"Cooking with Brava", https://www.brava.com/welcome/CookingWithBravadownloaded Jun. 17, 2020.
"Cooking with Light", https://blog.brava.com/2020/02/27/cooking-with-light/, downloaded Jun. 17, 2020.
"Electrolux launches CombiSteam Pro Smart", http://www.homeappliancesworld.com/2018/03/08/electrolux-launches-combisteam-pro-smart/, downloaded from internet on Jan. 18, 2019, 2 pages.
"Great Grub, Delicious Treats", https://www.greatgrubdelicioustreats.com/fried-egg-grilled-cheese-sandwich/, Nov. 29, 2015; download date Apr. 13, 2021; pp. 1-24.
"Steam Characteristics", ThermExcel, https://therexcel.com/english/taples/vap_eau.htm, included as thermExcel_steam_charateristics_2003.pdf, 2003.
"The Brava Tutorial—Youtube", https://www.youtube.com/watch?v=ZoW4iSb5U5k&t=1992s, Oct. 1, 2020.
"The Level Oven", https://level.ai, downloaded Jun. 17, 2020.
Chen, Pengfei, et al., "Understanding and Utilizing Deep Neural Networks Trained with Noisy Labels", Proceeding of the 36th International Conference on Machine Learning, Long Beach, California, PMLR 97, 2019.

(56) References Cited

OTHER PUBLICATIONS

Fang, Chi, et al., "Cooking Time Optimization on Given Machine Constraints and Order Constraints", Integer Programming Approach, Dec. 17, 2016.

Harris, William, "How Molecular Gastronomy Works", https://science.howStuffWorks.com/innovation/edible-innovations/molecular-gastronomy.htm accessed in 2021 included as "HowStuffWorks_How_Molecular_Gastronomy_Works.pdf", 2021.

Karimi, Davood, et al., "Deep learning with noisy labels: exploring techniques and remedies in medical image analysis", arXiv:1912.02911v4 [cs.CV] Mar. 20, 2020.

Li, Xin, et al., "On-Line Temperature Estimation for Noisy Thermal Sensors Using a Smoothing Filter-Based Kalman Predictor", Sensors, 2018, 18, 433, www.mdpi.com/journal/sensors.

Reitermanova, Z., et al., "Data Splitting", WDS '10 Proceedings of Contributed Papers, Part I, 31-36, 2010.

Sun, Da-Wen, "Computer Vision Technology For Food Quality Evaluation", Second Edition, Academic Press, 2016.

Xu, Yan, et al., "Multiple Clustered Instance Learning for Histopathology Cancer Image Classification, Segmentation and Clustering", 2012, IEEE (Year: 2012).

Bhogal, Nikhil, et al., "Thermal Management System and Method for a Connected Oven", U.S. Appl. No. 17/206,959, filed Mar. 19, 2021.

\* cited by examiner

APPLIANCE WITH GASEOUS COLLOID MANAGEMENT SYSTEM AND METHOD OF USE

CROSS-REFERENCE TO RELATED APPLICATIONS

This application is a continuation of U.S. application Ser. No. 17/948,045 filed 19 Sep. 2022, which is a continuation of U.S. application Ser. No. 16/268,296 filed 5 Feb. 2019, which claims the benefit of U.S. Provisional Application No. 62/626,651 filed 5 Feb. 2018, each of which is incorporated in its entirety by this reference.

U.S. application Ser. No. 16/268,296 filed 5 Feb. 2019 is a continuation-in-part of U.S. application Ser. No. 16/008,478 filed 14 Jun. 2018, which is a continuation of U.S. application Ser. No. 15/450,546 filed 6 Mar. 2017, which is a continuation of U.S. application Ser. No. 15/147,597, filed 5 May 2016, which claims the benefit of U.S. Provisional Application No. 62/157,325 filed 5 May 2015, each of which are incorporated in their entirety by this reference.

This application is related to U.S. application Ser. No. 15/888,395 filed 5 Feb. 2018, which is a continuation of U.S. application Ser. No. 15/170,678 filed 1 Jun. 2016, which claims the benefit of U.S. Provisional Application No. 62/169,323 filed 1 Jun. 2015, each of which is incorporated in its entirety by this reference.

TECHNICAL FIELD

This invention relates generally to the appliance field, and more specifically to a new and useful gaseous colloid management system and/or method in the appliance field.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

Figure 1:
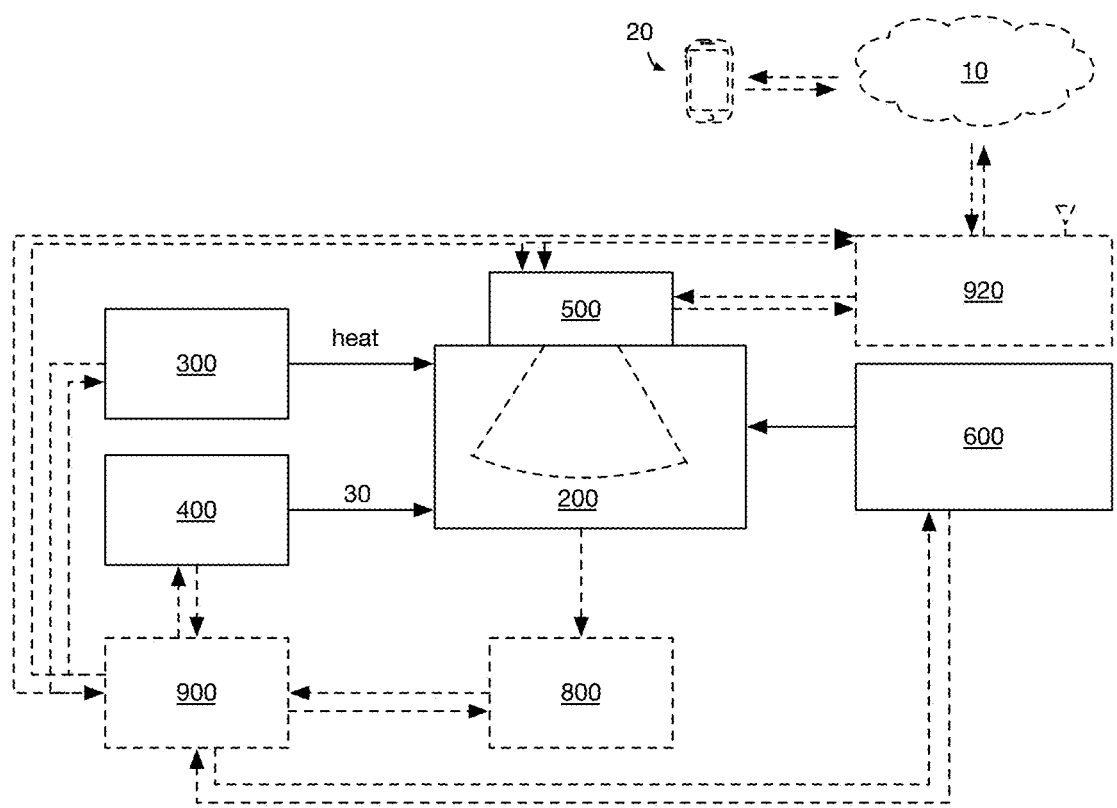
FIG. 1 is a schematic representation of the system.
Figure 3:
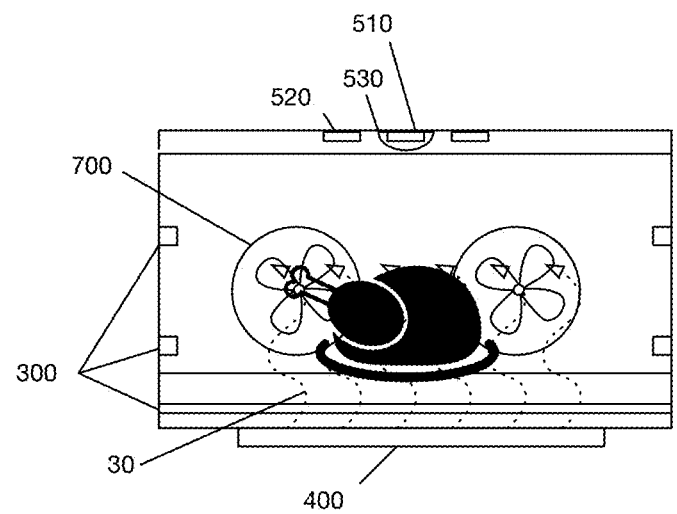
FIG. 3 is a schematic representation of an example of the system with an object inside the cavity.

As shown in FIG. 1 and FIG. 3, the system 100 includes: a body defining a cavity 200, heating elements 300, a gaseous colloid system 400, an optical system 500, and a visual obstruction management system 600. The system can optionally include: convection elements 700, auxiliary sensors 800, a processing system 900, and a communication system 920, but can additionally or alternatively include any other suitable component. The system can be used with one or more remote computing systems 10, applications 20, or any other suitable component. The system functions to visually monitor the cavity, more preferably objects within the cavity (e.g., food), in real- or near-real time, even while the cavity contains a gaseous colloid. For example, the system and/or method can image food, cooking in-situ, in real time within a steam oven or smoker filled with steam or smoke, respectively.

Figure 5:
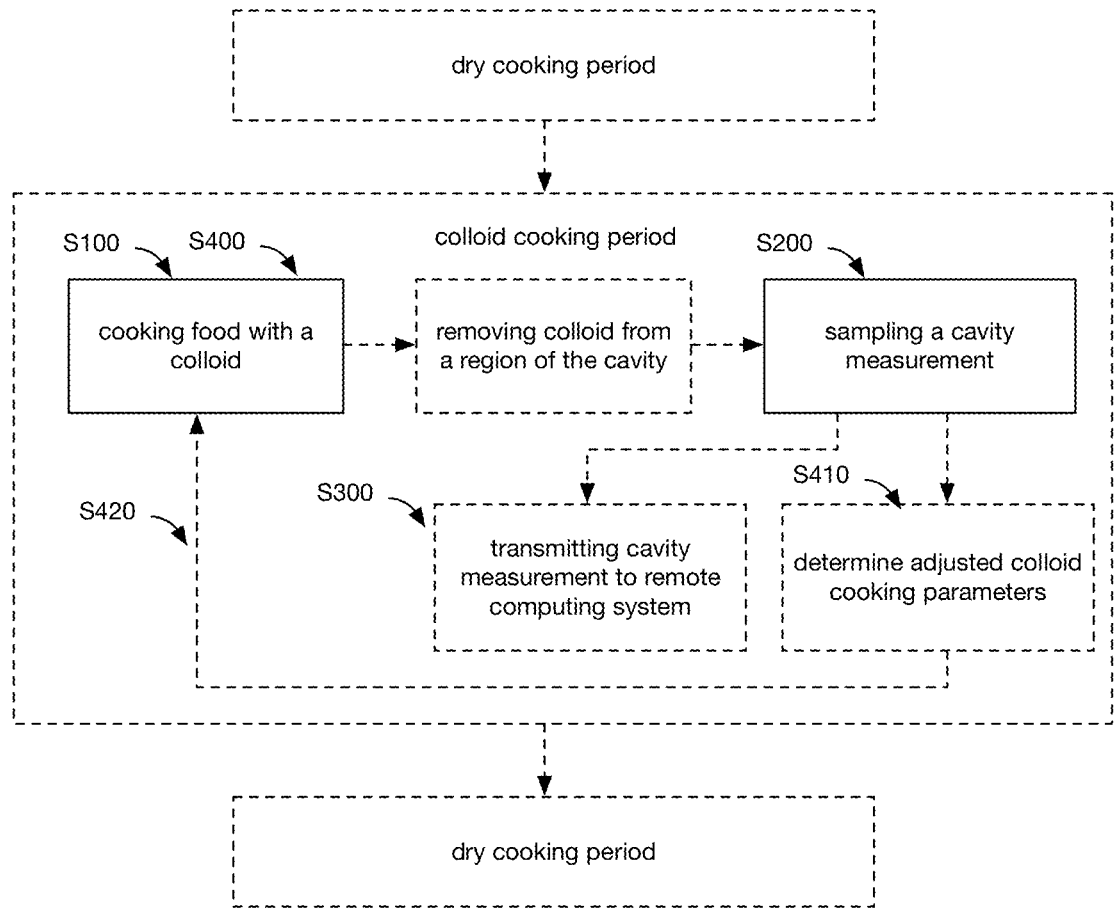
FIG. 5 is a schematic representation of the method.

As shown in FIG. 5, the method includes, during a colloid cooking period: cooking food during a colloid cooking period S100; and sampling a cavity measurement S200. The method can optionally include: minimizing the obstructive effect of the gaseous colloid on an in-situ optical system within the cavity; wherein the image is sampled while the obstructive effect of the gaseous colloid is minimized. The method can optionally include: transmitting the sampled image(s) to a remote computing system S300. The method can optionally include: cooking the food according to adjusted colloid cooking parameters S400. However, the method can be otherwise performed. The method is preferably performed by or with the system disclosed above, but can be performed with any other suitable system.

The gaseous colloid 30 is preferably an aerosol or mist (e.g., liquid droplets suspended in gas), but can alternatively be smoke (e.g., solid particulates suspended in gas) or any other suitable gaseous colloid. The gaseous colloid preferably includes a gaseous medium of suspension (e.g., air) and a dispersed phase (e.g., dispersed material). The dispersed phase can include: carrier fluid (e.g., water, ethanol, other solvent) and optionally an additive (e.g., flavoring), solid (e.g., wood, carbonaceous material, dust, etc.), or any other suitable material.

The system is preferably an appliance, more preferably a cooking system (cooking appliance), but can be another appliance, such as a dishwasher. The cooking system can be: an oven (e.g., steam oven, convection steam oven, semi-steam oven, multifunction oven with moisture functions, etc.; specific example shown in FIG. 14 and FIG. 15), a grill, a range hood, a smoker, or any other suitable cooking system.

The system is preferably operable between a set of modes. In one variation the set of modes includes a dry operation mode (e.g., dry cooking), wherein the cavity includes less than a threshold percentage of the gaseous colloid (e.g., less than 10%, 0%, etc. humidity, by volume, etc.); and a wet operation mode, wherein the cavity includes more than a threshold percentage of the gaseous colloid (e.g., more than 0%, etc.). Examples of the wet operation mode can include: steaming food within the cavity, smoking food within the cavity, cooling the cavity below the food temperature (e.g., such that the food steams), or otherwise operating a system in the wet operation mode.

2. Benefits

The system and/or method can confer several benefits over conventional systems. In particular, variants of the system and/or method can enable real time in-situ cavity imaging while still being able to use treatment methods that involve steam or other visual obstructions.

First, variants of the system and/or method can minimize the obstructive effect of the gaseous colloid on the sampled image. In one example, the system and/or method uses a different light wavelength (e.g., longer wavelengths, such as IR) to illuminate and image the cavity. In a second example, the system and/or method can disperse, condense, or otherwise move the gaseous colloid away from the foodstuff before imaging. In these examples, the process can be performed periodically (e.g., infrequently; every minute, etc.) to minimize the process' effect on the cooking process. In a third example, the system and/or method can virtually generate a synthetic image of the foodstuff based on one or more sampled images (frames). In specific examples, the synthetic image can be generated by: averaging images sampled over a predetermined timeframe (e.g., wherein the timeframe can be determined as a function, such as an inversely related function, of the airflow within the cavity); identifying unobstructed portions of the food appearing in a series of images and stitching the unobstructed portions together; or otherwise generated.

Second, variants of the system and/or method can minimize or eliminate condensation of the dispersed phase (of the gaseous colloid) on the camera lens, which can warp the resultant image and/or obstruct portions of the camera's field of view. In one example, the system and/or method can substantially match the temperature of the camera lens (or transparent interface between the cavity and the camera) to the cavity temperature (e.g., within 5° C.) or heat the camera lens above the cavity temperature. In another example, the system and/or method can blow the gaseous colloid away from the camera lens with a convection element (e.g., fan). In another example, the system and/or method can superheat the colloid or remove water vapor from the colloid.

Third, variants of the system and/or method can enable users to visually monitor the food during the colloid cooking period by streaming video of the cavity interior to remote computing systems (e.g., remote server systems, user devices, etc.). This can be particularly useful in applications where opening the cavity will adversely impact the food cooking progress, such as when steaming or smoking. In examples, this experience can be augmented by post-processing the video before transmission to the user, such as darkening the background and/or increasing the food and colloid contrast.

Fourth, variants of the system and/or method can monitor food parameters (e.g., food state, internal temperature, etc.) during the colloid cooking period. In a first example, the system and/or method can virtually reconstruct (e.g., model) the state of the foodstuff (or objects) within the cavity and/or the cavity itself based on: images recorded prior to wet operation, food models (e.g., specific to the food class), the operation instructions (e.g., recipe), cavity models (e.g., specific to the cavity type, the individual cavity), auxiliary sensor measurements (e.g., using sensor fusion models), and/or any other suitable method. In a second example, the system and/or method can apply analyses, applied to unobstructed food images, to the image (raw or synthetic) to monitor the food parameters (e.g., food state).

However, the system and/or method can confer any other suitable set of benefits.

3. System

Figures 2A, 2B:
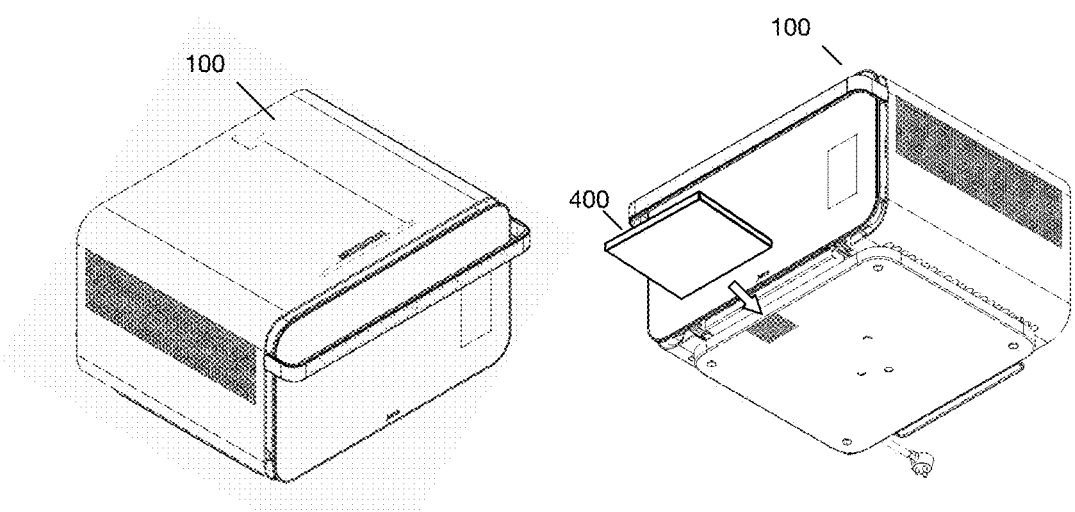
FIGS. 2A and 2B are isometric views of an example of the system.

The body of the system 100 functions to define the cavity 200 (e.g., cooking cavity) that receives the object (e.g., food) and retains the gaseous colloid, but can additionally or alternatively create a controlled environment for cooking, retain heat, or perform any suitable function. The body can include: a top, bottom, left and right sides, back, and door, or be otherwise defined. Each body panel (e.g., top, bottom, etc.) can be a single-walled panel, dual-walled panel, or have any suitable number of walls. When the panel includes more than one wall, the panel can optionally include or define, between the panels: thermal insulation, electrical insulation, fluid channels (e.g., gas channels, liquid channels), cooling channels, wiring conduits, or any other suitable structure. The body can be thermally insulated, fluidly sealable (e.g., form a fluidly sealed cavity when the door is closed), or have any other suitable thermal or fluid properties. Examples of the body include: an oven body (example shown in FIG. 2A and FIG. 2B), grill body, hood, smoker body, dishwasher body, or any other suitable appliance housing.

The heating elements 300 of the system 100 function to heat the cavity and/or objects within the cavity. The system can include one or more heating elements of one or more types. The one or more heating elements can be arranged in the cavity's: top, bottom, sides, back, and/or door. In one example, the system includes heating elements along the cavity bottom and/or top. In a second example, the system includes heating elements encircling the convection elements (e.g., in the cavity back). However, the heating elements can be otherwise arranged. The heating elements can be controlled by the processing system, a remote control system, or any other suitable system. The heating elements are preferably controlled in banks (e.g., sets of heating elements are individually indexed and controlled), but can alternatively be controlled independently, controlled together as a group, or otherwise controlled. Examples of heating elements that can be used include: resistive heating elements, such as metal elements, ceramic elements (e.g., MoSiz), burners (e.g., flame burners, tube burners, jet burners, etc.), carbon filament, polymer (e.g., PTC); exothermic reactions; heat lamps; heat pumps (e.g., Peltier pumps); induction elements; or any other suitable heat-generating element.

The system 100 can optionally include convection elements 700, which function to induce bulk movement of fluid within the cavity. For example, the convection elements can enable convection cooking, and can function as the condensation management system. The system can include one or more convection elements, preferably an even number but alternatively an odd number. The convection elements are preferably active (e.g., actively controlled by the processing system), but can alternatively be passive (e.g., leverage the stack effect). The convection elements are preferably arranged in the cavity back, but can be otherwise arranged. Examples of the convection elements include: ducted fans, non-ducted fans, a pump, any suitable fan, or any suitable convection element. The convection elements are preferably counter rotated in operation (e.g., a first fan rotates clockwise while the second fan rotates counterclockwise), but can be otherwise operated. The convection elements are preferably fluidly connected to the cavity at both ends (e.g., through the fan face, through gaps in the cavity interior panels), but can alternatively or additionally be connected to the ambient environment, the gaseous colloid system, or any suitable system.

The gaseous colloid system 400 (GCS) of the system 100 (e.g., cooking appliance) functions to supply and/or remove gaseous colloid to and/or from the cavity. The GCS can provide discrete amounts of gaseous colloid into the cavity (e.g., discrete unit volumes, discrete % humidity, etc.), gaseous colloid volumes along a continuous spectrum, or any suitable amount of gaseous colloid. The GCS is preferably integrated into the system, but can alternatively be arranged outside of the system and fluidly connected to the cavity, or otherwise arranged. The GCS is preferably a singular unit, but can alternatively be formed from multiple components dispersed across the system.

The GCS 400 can include: a material source, dispersion element, and one or more inlets and/or outlets. The GCS can optionally include a waste reservoir, a gaseous colloid movement system, a gaseous colloid condensation element, an emission control device, and/or any suitable component.

The material source of the GCS 400 functions to retain the dispersed material of the gaseous colloid pre-dispersion, but can alternatively retain pressurized gaseous colloid, a solid gaseous colloid precursor, or any suitable material. The dispersed material can include: water, biomass or carbonaceous material (e.g., wood chips), flavor additive, or any other suitable food treatment. The material source can be a reservoir, waterline, or any other suitable source. The reservoir (e.g., tray) can be located: in the body bottom (e.g., along an exterior face of the body bottom, example shown in FIG. 2B and FIG. 3; within the inter-wall cavity of the body bottom), in the body side, or otherwise located. The reservoir is preferably removably connectable to the system, but can alternatively be integrated. The reservoir preferably fluidly connects to the cavity via a valve and fluid manifold, but can be otherwise connected to the cavity.

The dispersion element of the GCS 400 functions to disperse the dispersed material into the suspension medium (e.g., air). The dispersion element is preferably a heating element, but can alternatively be a pressurization mechanism, electrospray systems, nozzles, valves, or any suitable system. Examples of the heating element include: heating coils (e.g., arranged within or around the waterline or fluid manifold), heating elements thermally connected to the reservoir, heat-generating components of the system (e.g., processing system, wireless communication system, etc.), cooling systems for heat-sensitive components of the system (e.g., camera lens cooling system), the cooking elements (e.g., heating elements for cooking), or any suitable element. The heating element can heat the entire reservoir (e.g., be thermally connected to the reservoir), heat unit volumes of the dispersed material (e.g., be thermally connected to the waterline or fluid manifold between the reservoir and the cavity), or heat any suitable dispersion material volume. The heating element preferably heats the dispersion material to a phase change temperature (e.g., liquid-gas phase change temperature, such as 100° C. for water; a solid-gas phase change temperature, such as a combustion temperature), but can heat the dispersion material to any suitable temperature. Heating of the dispersion material is preferably binary (e.g., heated or not heated), but can alternatively be dynamically controlled along a continuum (e.g., heated to a specific temperature). The dispersion material can be: incrementally heated (e.g., wherein portions of the dispersion material are serially heated), heated en masse, or otherwise heated.

The inlet(s) and/or outlet(s) of the GCS 400 function to fluidly connect the cavity with the material source and/or waste reservoir, respectively. The GCS can include one or more inlets and/or outlets. The inlets and/or outlets can optionally include passive valves (e.g., check valves with an upstream cracking pressure above atmosphere, etc.) or active valves (e.g., solenoids). The inlets can be located anywhere within the cavity (e.g., bottom, top, sides, etc.). Examples of the inlet include: nozzles (e.g., swirl nozzles, straight nozzles, etc.), apertures, or any suitable inlet. The outlets are preferably located along the cavity bottom (e.g., the bottom center, the bottom edge(s), etc.), but can alternatively or additionally be located along the cavity sides, back, and/or top. In the latter variants, the colloid movement system can move the gaseous colloid toward the outlet, or the gaseous colloid can move toward the outlet through convection. Examples of the outlet include: gaps in the body panels, the door opening (e.g., wherein the waste reservoir can be the ambient environment), vents, or any suitable outlet.

The waste reservoir of the GCS 400 functions to collect condensed dispersion material and/or cycled gaseous colloid (or portions thereof) that had previously been in the cavity. The waste reservoir can be the material source or be a separate volume (e.g., fluidly separated from the material source). The waste reservoir is preferably fluidly connected to the outlet, and is preferably arranged below the outlet, but can alternatively be otherwise arranged (e.g., in the side, wherein a pump pumps the gaseous colloid, or portion thereof, from the outlet to the waste reservoir). Examples of the waste reservoir include: the ambient environment, the sewer line, the material source, or any suitable reservoir.

The gaseous colloid movement system (GCMS) of the GCS 400 functions to move the gaseous colloid within the cavity, and can optionally remove the gaseous colloid from the cavity. The GCMS can leverage: pressure differentials (e.g., pulling a vacuum on or pressurizing the cavity), bulk movement of the cavity gas (e.g., using fans, using the convection elements of the system), temperature differentials (e.g., using convection), density differentials, concentration differentials (e.g., using diffusion), or any suitable motive mechanism. In a first variation, the GCMS include components used in dry operation. In one example, the GCMS include the convection elements 700 (e.g., convection fans) used for dry cooking or baking. In a second variation, the GCMS includes a separate component, such as secondary fans (e.g., arranged along the sides of the cavity, along the top of the cavity, etc.), a suction-generating pump (e.g., fluidly connected to the outlet), or another component.

The gaseous colloid condensation element (GCCE) of the GCS 400 functions to condense the gaseous colloid into a compact state, such as liquid or solid. The GCCE is preferably located between the outlet and the waste reservoir, but can alternatively or additionally be located within the waste reservoir or otherwise arranged. Examples of the GCCE include: a condensation plate exposed to the gaseous colloid along a first face and exposed to the ambient environment (or another lower-temperature sink) along a second face opposing the first face; a Peltier pump, a pressure cavity or portion thereof (e.g., a piston within the waste reservoir), or any other suitable condensation system. In variants, the GCCE can be tilted downward toward the waste reservoir, such that the condensate runs off into the waste reservoir.

In an example, the GCS 400 includes a removable material tray arranged in the system bottom, outside the cavity; a set of inlets fluidly connecting the tray to the cavity through the system bottom; a heating element thermally connected to the material tray cavity (e.g., wherein the tray includes a heater that plugs into a power source on-board the oven); and a Peltier pump or condensation plate as the GCCE, located within the system bottom and fluidly connected to the material tray. In this example, the material tray functions as both the material source and the waste reservoir; the inlet can double as the outlet; and the cooking convection elements can function as the GCMS. The inlet/outlet can optionally include a valve that selectively connects the cavity to an inlet manifold (connected to the material tray) and an egress manifold (connected to the GCCE). In operation, the heating element heats the dispersion material (e.g., water) within the material tray, which evaporates through the inlet into the cavity to supply the gaseous colloid to the cavity. To remove the gaseous colloid, the cooking convection elements can blow (and/or suck) the gaseous colloid toward the inlet/outlet, wherein the positive cavity pressure forces the gaseous colloid into the outlet, over the GCCE. The condensed dispersed material is then fed back into the material tray. However, the GCS can be otherwise configured.

The emission control device (ECD) of the GCS 400 functions to remove particulates from the cavity effluent. The ECD is preferably fluidly connected to the outlet (e.g., of the GCS, of the convection element or convection system), and can optionally be connected to: the inlet of the GCS, the inlet of the convection element, a vent fluidly connected to the ambient environment, or to any other suitable endpoint. In operation, the system flows the cavity effluent through, by, over, or otherwise proximal the ECD, wherein the ECD removes all or a portion of the dispersed phase from the cavity effluent (example shown in FIG. 15). The cleaned effluent can then be vented out of the system or returned to the cavity. The ECD can include: a catalytic converter, a filter, a wet scrubber, a dry scrubber, an adsorbent, a condenser, a precipitator, or any other suitable emission control device. In one variation, the ECD can be selectively connected to the convection element's fluid path, wherein the ECD is fluidly connected to the convection path when the colloid should be removed or reduced (e.g., for imaging, at the end of the colloid cooking period), and fluidly disconnected when the colloid should be maintained. However, the ECD can be otherwise used.

The optical system 500 of the system 100 (e.g., appliance) functions to sample images of the cavity and/or objects therein (e.g., foodstuff). The images (e.g., still frames, frames of a video) can be: used for object monitoring, streamed to a remote system (e.g., server system, user device, etc.), displayed on a local system (e.g., the appliance, a local device), machine learning (e.g., recipe refinement), or otherwise used. Object monitoring can include: extracting object features from the image (e.g., gradients, edges, foreground, etc.) and determining object parameters based on the object features (e.g., size, geometry, color, etc.). When the image is part of a time series, sequential object parameter values can be used to determine changes or rates of change in the object parameters. However, the images can be otherwise used.

The optical system 500 is preferably in-situ (e.g., within the cavity), but can alternatively be external the cavity. The optical system is preferably integrated into the system, but can alternatively be a module that is removably couplable to the system. The optical system is preferably that disclosed in U.S. application Ser. No. 15/450,546, but can alternatively be any suitable optical system. The optical system can include one or more: cameras 510, emitters 520, lenses 530, and/or other optical components. The optical system is preferably optically connected to the cavity (e.g., monitors the cavity), but can be otherwise arranged.

The optical system 500 can include a single camera (e.g., along the cavity top), a camera on each of a set of cavity panels, an array of cameras on a single cavity panel (e.g., a stereocamera system), or any suitable number of cameras on any panel. The camera(s) can be: CCD camera, CMOS camera, or any suitable camera. The camera can be a visible range camera, IR camera, UV camera, multispectral camera, hyperspectral camera, or be sensitive to any suitable wavelength range. The camera can be selectively, continuously, or otherwise operated.

Figure 4:
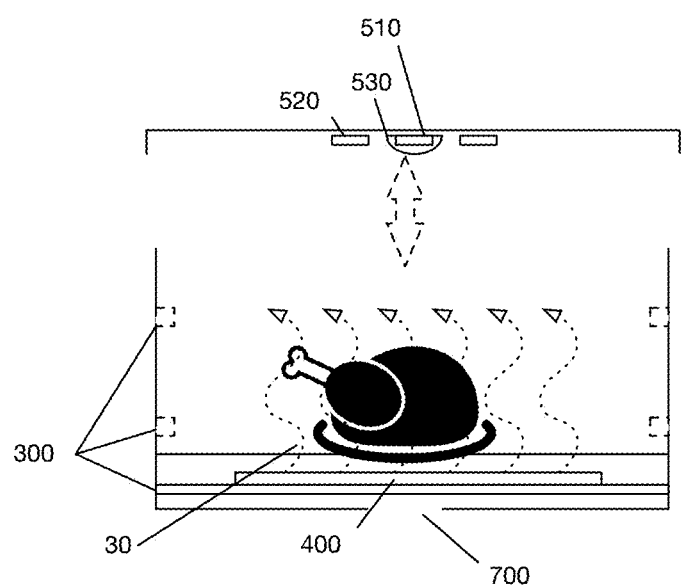
FIG. 4 is a schematic representation of a second example of the system with an object inside the cavity.

The camera(s) are preferably substantially centered along the face of the cavity panel, but can be offset or otherwise located. The camera(s) are preferably mounted to the ceiling of the cavity (e.g., a lid, such as that shown in FIG. 4; a top panel; etc.), but can alternatively be arranged along the cavity sides, the cavity door, the cavity bottom, the back of the cavity, or along any suitable surface. In variants where the optical system is integrated into the system, the cavity ceiling preferably includes a transparent section (e.g., made of glass, plastic, or any other suitable optically-transparent material), wherein the camera(s) are mounted behind (and/or aligned with) the transparent section. In variants, this transparent section is heated to substantially match (e.g., within several degrees) or exceed the cavity temperature to prevent condensation. In one example, the system includes a first camera centered along the oven top and a second and third camera arranged on either side of the first camera, wherein the fields of view of the second and third cameras encompass a predetermined angle from the cavity or rack center (e.g., 45° from the cavity or rack center). However, the camera can be otherwise arranged.

The optical system 500 preferably includes multiple emitters, but can alternatively include a single emitter or no emitters (e.g., use ambient light). In a first variation, the optical system includes a set of emitters (e.g., an emitter pair, an emitter array) bracketing a center camera (e.g., in the cavity top). The set of emitters can be flush with the camera lens, recessed behind the camera lens or camera sensor, or otherwise arranged. In a second variation, the optical system can additionally or alternatively include emitters on the side panels (e.g., aligned with a rack position, slightly raised above a rack position), and optionally the back panel or the cavity bottom. However, the optical system can include any suitable number of emitters in any configuration. The emitters can emit: visible light (e.g., white light, colored light, etc.), IR light, UV light, RF, or electromagnetic radiation in any suitable wavelength. The parameters of the light emitted by the emitters (e.g., color, saturation, hue, color temperature, etc.) can be static or selectively controlled (e.g., dynamically controlled when an image is to be sampled, such as to increase contrast or decrease noise). The emitters can be LEDs, lamps, the heating elements, or be any suitable element. The emitters can be selectively, continuously, or otherwise operated. The emitters can be indexed and controlled in banks (e.g., as a set), individually, as a unit, or otherwise controlled. In one example, the optical system includes visible-light-emitting elements and IR-light-emitting elements, wherein the visible-light emitting elements are controlled separately from the IR light emitting elements (e.g., the visible light elements are used when less than a threshold amount of gaseous colloid is in the cavity, and the IR light elements are used when more than a threshold amount of gaseous colloid is in the cavity). In a second example, the optical system includes left and right visible-light emitting elements, which can be selectively operated when the cavity includes gaseous colloid (e.g., in lieu of the top visible-light emitting elements). In a third example, the optical system includes top-down light emitting elements and side-angled light emitting elements, wherein the top-down light emitting elements are used when less than a threshold amount of gaseous colloid is in the cavity, and the side-angled light emitting elements are used when more than a threshold amount of gaseous colloid is in the cavity. However, the system can include any suitable number of emitters in any suitable configuration.

The visible obstruction management system 600 (VOMS) functions to eliminate or minimize camera field of view (FOV) obstruction by the gaseous colloid (e.g., minimize the obstructive effect of the gaseous colloid on the in-situ optical system within the cavity), such that the optical system can still image the object (e.g., foodstuff) while the object is being treated with the gaseous colloid. The VOMS can be used during wet operation (e.g., during the colloid cooking phase), and can additionally or alternatively be used during dry operation, when a gaseous colloid density threshold is surpassed, or at any suitable time. Different VOMS can be used for different operation conditions (e.g., a first VOMS selected for a first colloid density range, a second VOMS selected for a second colloid density range; an optical VOMS used when the colloid density is less than a threshold colloid density, such as 10 $m^2$/kg or 25 $m^2$/kg, and a sensor-fusion VOMS used when the colloid density is above the threshold colloid density; etc.). Alternatively, the same VOMS can be used for all operation conditions. This can enable object parameter monitoring, image streaming, or other image-based analyses during gaseous colloid treatment (e.g., steaming, smoking, etc.). The VOMS can optionally be selectively operated to achieve desired gaseous colloid appearances or patterns (e.g., swirls, selective edge covering, etc.).

The VOMS 600 is preferably formed a combination of existing appliance components (e.g., the convection elements, the heating elements, the light emitting elements, etc.), but can alternatively be a different system. The VOMS can be actuated during, before, and/or after the image is sampled by the optical system, when lens condensation is detected (e.g., based on the image, sensor measurements, etc.), when more than a threshold amount of visual obstruction is determined (e.g., estimated based on the amount of supplied gaseous colloid, determined based on the sampled images, etc.), when the cooking instructions specify VOMS actuation (e.g., during or after the colloid cooking period), or at any suitable time. Different variants of the VOMS can be used for different: object classes (e.g., food classes), object parameter value combinations, gaseous colloid densities, gaseous colloids, or be selected in any suitable manner.

Figure 9:
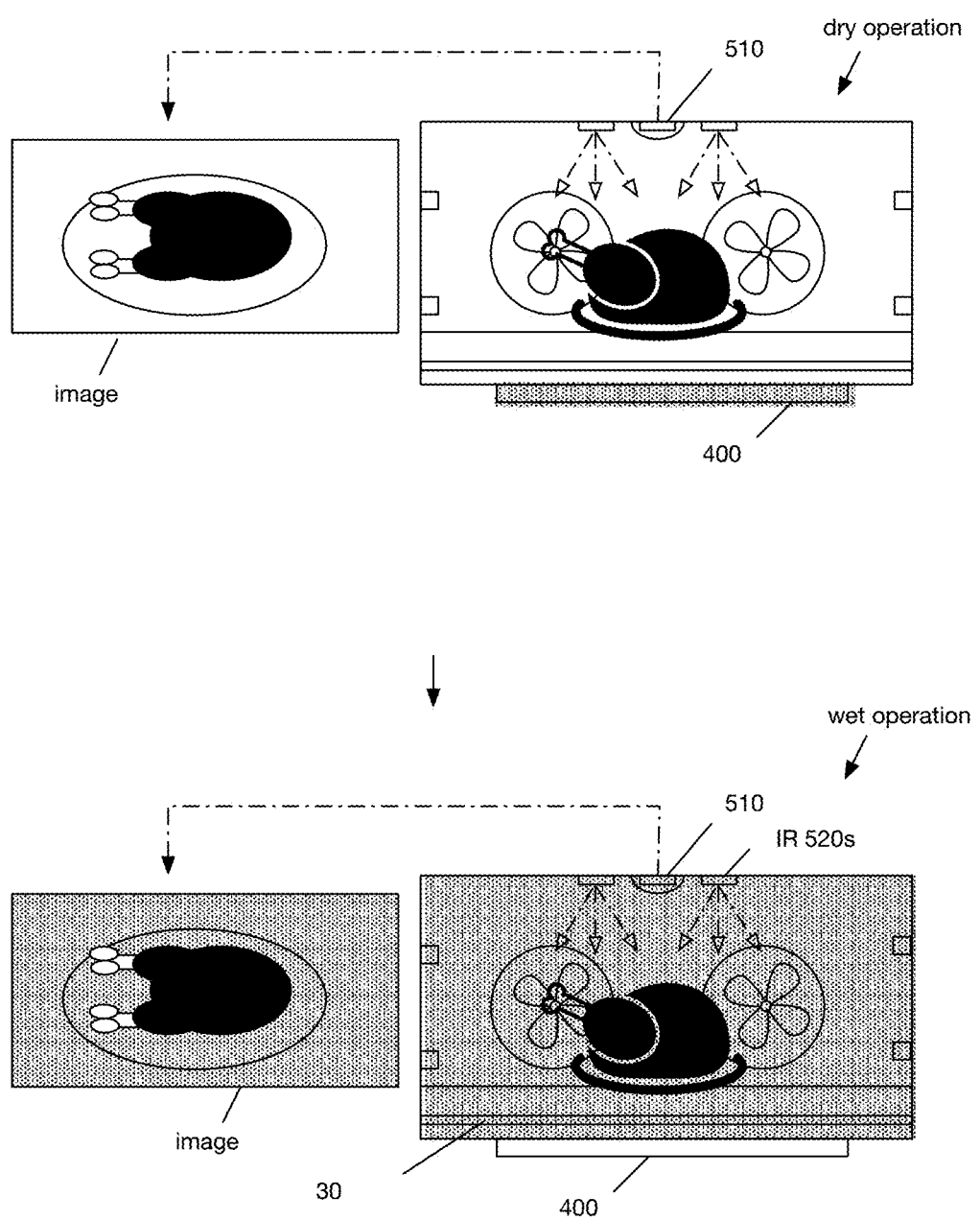
FIG. 9 is a third example of the visual obstruction management system in operation.
Figure 10:
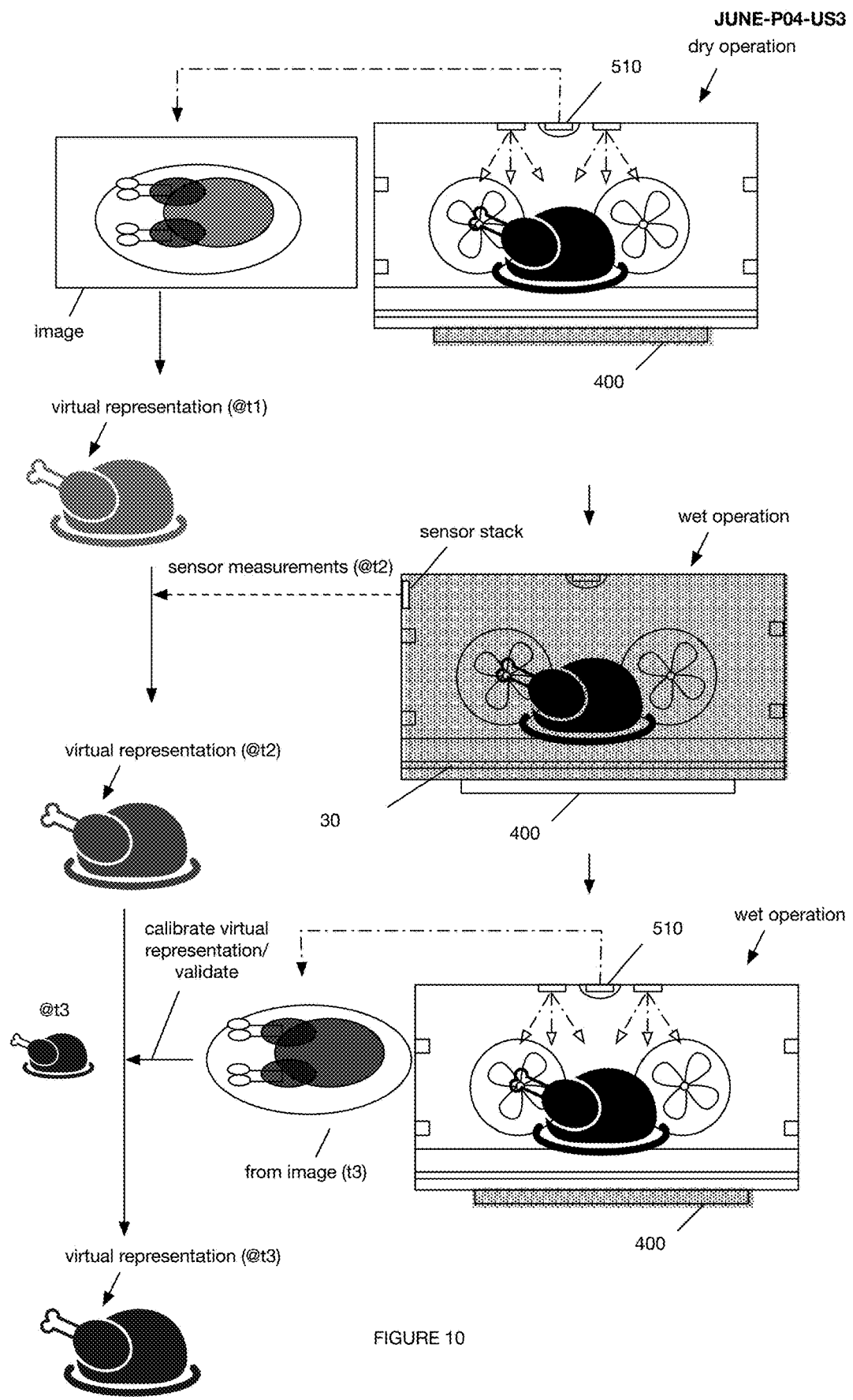
FIG. 10 is a fourth example of the visual obstruction management system in operation.

In one variation, example shown in FIG. 9, the VOMS 600 includes the camera and long-wavelength emitters (e.g., IR emitters) arranged on the oven top (cooking cavity ceiling), wherein IR light is used to image the object. In this variation, the IR emitters are preferably operated periodically (e.g., in conjunction with image recordation), but can alternatively be operated continuously. In this variation, the system can optionally account for the cooking effect of the IR light incident on the foodstuff (e.g., estimated, determined from the image), and dynamically adjust the recipe or heating element operation instructions to accommodate.

Figure 7:
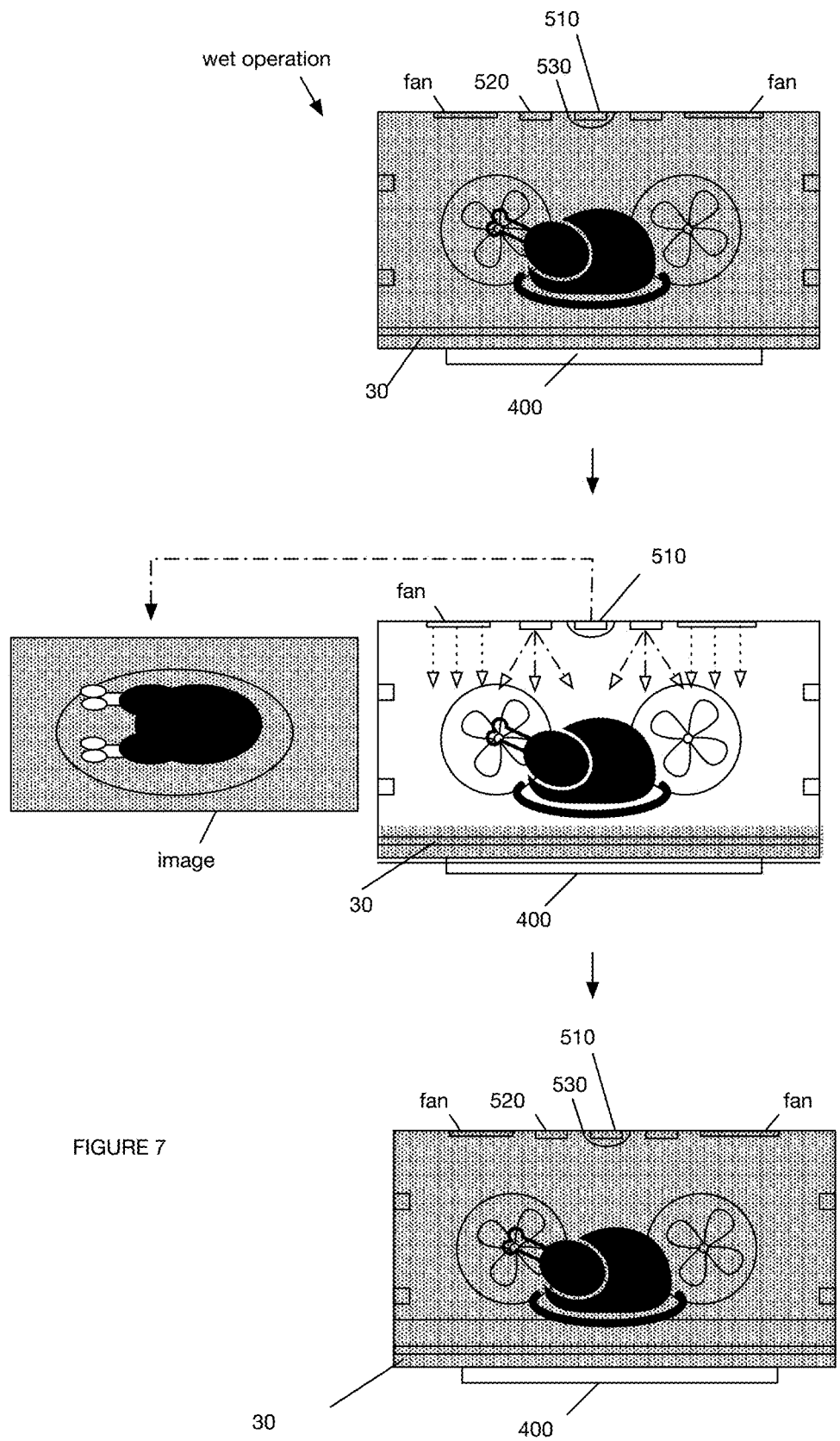
FIG. 7 is a first example of the visual obstruction management system in operation.

In a second variation, example shown in FIG. 7, the VOMS 600 includes the camera, the visible-light emitters, and a colloid removal system that removes all or a portion of the colloid from a region within the cavity. The colloid removal system can include: the convection elements, the GCS (e.g., the ECD, GCCS, etc.), a purging system, or any other suitable system that removes the colloid from a portion of the cavity.

In embodiments in which the VOMS 600 includes the convection elements, the convection elements can temporarily move the gaseous colloid to a holding location within the cavity (and/or temporarily vacate the volume proximal the object) before an image is sampled. The holding location can be: the outlet, the cavity bottom, a corner (e.g., top corner, bottom corner, etc.), a side, the material supply, the waste reservoir, the ambient environment, or any suitable location. The holding location can be predetermined (e.g., always be the cavity bottom), dynamically determined (e.g., distal the object, as determined from the image), or otherwise determined.

In a second embodiment, the colloid removal system can remove the colloid from the cavity. In a first example, the system can flow the gaseous colloid from the cavity, through the colloid removal system, to the ambient environment and/or back into the cavity, wherein the image is recorded after a minimum colloid density within the cavity is met. In a second example, the VOMS can optionally condense the gaseous colloid (e.g., with the GCCE) until after the image is recorded (example shown in FIG. 8). The region entirely or partially cleared by the VOMS can be: between the camera and the foodstuff, proximal the food, be the entire cooking cavity (cooking cavity), be a portion of the cooking cavity, or be any other suitable region.

In system variants including the second VOMS variant, the system can selectively remove the gaseous colloid from the volume at less than a predetermined frequency, wherein the frequency is selected to minimize the adverse affect on the object treatment (e.g., vacated every minute, vacated every 2 minutes, vacated when food parameters match a predetermined value, etc.). For example, steam can be blown to the oven bottom every 1 minute (e.g., with convection elements located in the oven top) to allow the camera to image the foodstuff, after which the steam is recirculated to substantially isotropically fill the cavity. Alternatively, the frequency at which the gaseous colloid is removed (and/or the amount of colloid that is removed) can be built into the recipe or operation instructions. Alternatively, the imaging frequency can be timed with high flow rate or high turbulence cooking steps during the colloid cooking period.

In a third variation, the VOMS 600 includes the camera and secondary emitters, wherein the secondary emitters are used to illuminate the object when more than a threshold density of gaseous colloid is in the cavity, and/or when the gaseous colloid density is within a predetermined density range. The secondary emitters can emit light 90° (or any non-0°) to the camera's viewing vector, can oppose the camera, be arranged behind the camera, or be otherwise arranged.

In a fourth variation, the VOMS 600 includes a camera array along the top of the cavity, wherein the side cameras (e.g., cameras distal the panel center and/or cameras estimated to be a predetermined angle from the object, such as) 45° are used to image the object in lieu of the center camera (e.g., feeds from the side camera are used for object analysis).

Figure 8:
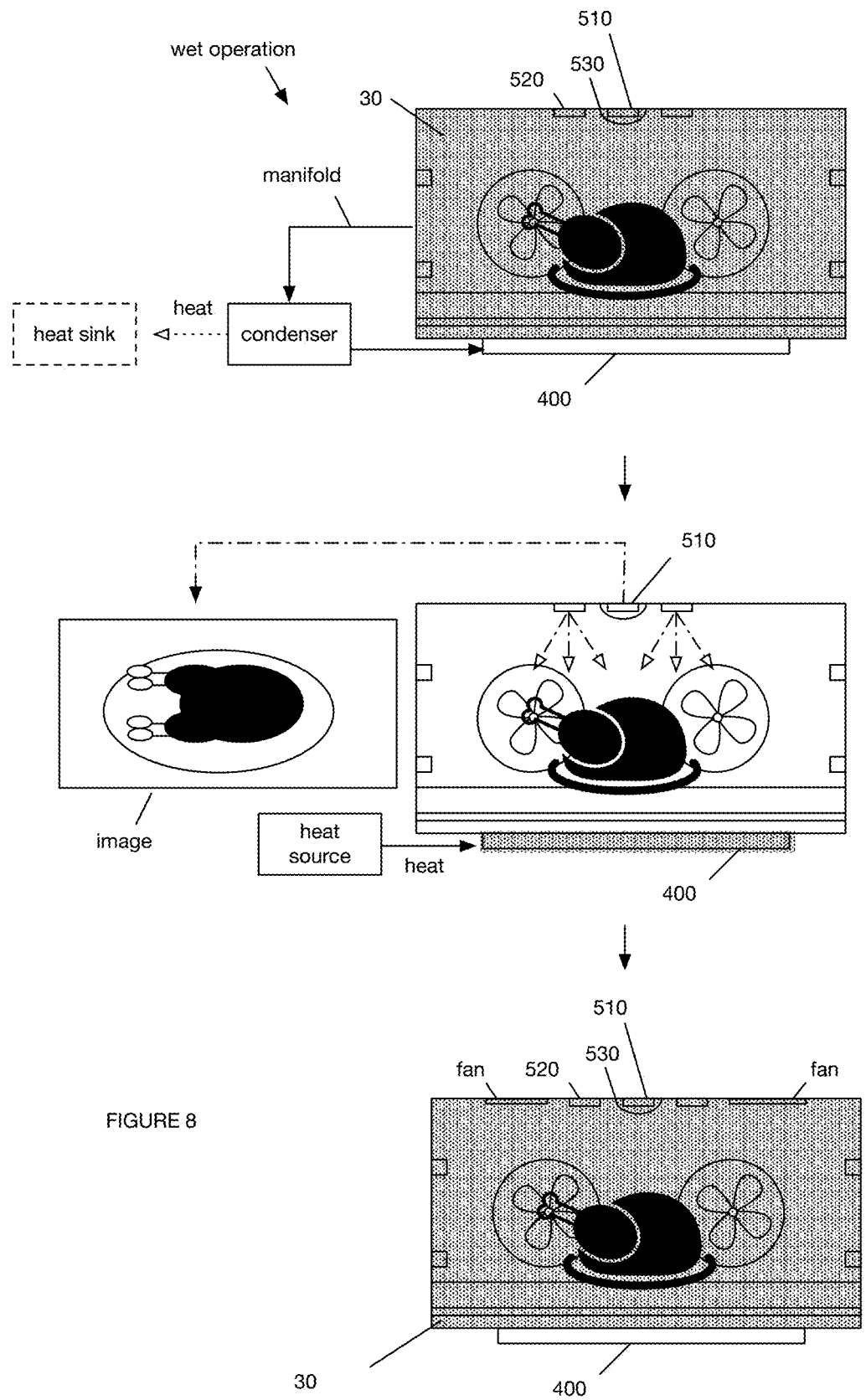
FIG. 8 is a second example of the visual obstruction management system in operation.

In a fifth variation, example shown in FIG. 8, the VOMS 600 include system sensors and a set of virtual models associated with the object, wherein a virtual representation of the object can be determined using the sensor measurements and the virtual models. The virtual model is preferably associated with the object class (e.g., food type, such as meat or vegetable, chicken or pork), but can alternatively be associated with the current recipe being executed, with the gaseous colloid class, with the specific system, or be any suitable model. The virtual model can be retrieved from the remote computing system, stored on the system, stored on the remote computing system, or otherwise stored, updated, and/or maintained. The virtual model can be a parametric model (e.g., the chicken will have a specific internal temperature given the cavity temperature patterns), a deterministic model, a probability model (e.g., the food has a 90% probability of having a given set of geometries), leverage neural networks (e.g., convolutional neural networks), a selection model (e.g., wherein the object parameters are selected from a table based on the sensor measurements), decision trees, Baysean methods, kernel methods, genetic programs, or include any suitable model. The virtual model is preferably generated (e.g., learned) from historic cooking sessions (e.g., crowdsourced over other users, etc.), but can alternatively be manually determined or otherwise determined. In this variation, one or more virtual representations of the object (e.g., virtual representations of the food) can be automatically generated by feeding the sensor measurements into the virtual model(s), wherein the virtual object representation can be monitored in lieu of the physical object. The virtual representation can include: food states (e.g., internal temperature, doneness, etc.), food parameters (e.g., size, shape, weight, texture, temperature, etc.), a 2D or 3D model, or any other suitable representation. The virtual representation can be generated on-board the system, by a remote system (e.g., wherein system sensor measurements are transmitted to the remote system), or by any suitable system. For example, changes in internal temperature (e.g., sampled by a temperature probe) can be fed into a model to determine the food state.

The system can optionally include a set of auxiliary sensors 800, which function to sample auxiliary cavity measurements (e.g., in addition to the cavity images). These auxiliary measurements can be used to augment, replace, validate, or otherwise interact with the optical system measurements. The sensors 800 are preferably integrated into the system, but can alternatively be removably coupled to the system (e.g., integrated with the optical system, be a separate module, etc.) or otherwises mounted to the system. The sensors preferably monitor the cavity, but can alternatively or additionally monitor: system outputs (e.g., heating elements, convection elements, GCS, etc.; be part of a closed feedback loop, etc.), the ambient environment (e.g., ambient light, ambient sound, etc.), or any other suitable monitoring endpoint. Examples of sensors that can be used include: optical sensors (e.g., visible-range cameras, such as the cameras monitoring the food during dry operation; IR cameras; UV cameras; etc.); non-visual sensors, such as acoustic sensors (e.g., microphones, which can pick up treatment sounds such as crisping, crackling, or drips); sonar, radar, lidar, or other ranging systems (which can be used to determine object geometries and/or changes over time); orientation sensors (e.g., accelerometers or IMUs, which can detect object position changes); hardness measuring systems; ultrasound systems; temperature sensors (e.g., a temperature probe, wet and/or dry thermistors); humidity sensors; particulate sensors; weight sensors (e.g., in the rack supports, feet, etc.), or any other suitable set of sensors. In a first variation, the sensor measurements are sampled before modeling. In an embodiment of the first variation, the virtual representation is modeled based on past sensor measurements, and is then extrapolated to estimate a current object parameter value using a predetermined extrapolation model, current secondary sensor measurements, and/or based on historic: object parameter values (e.g., food color extracted from the last color image, food shape extracted from the last image, etc.), sensor measurements (e.g., historic change in temperature or moisture over the cooking session), or otherwise extrapolated to estimate a current object parameter state or value. In a second variation, the sensor measurements are sampled after modeling, wherein the sensor measurements can be used to validate the model, calibrate the virtual representation, train the model, or otherwise used. In a third variation, the virtual representation is generated in real-time (e.g., based on non-visual sensor measurements).

In one example, the virtual representation can be initially generated based on visually-determined object parameters (e.g., color, size, etc.), and updated based on non-visual sensor measurements (e.g., acoustic sensors, etc.) while the cavity is filled with gaseous colloid. In this example, the virtual representation can be corrected or otherwise adjusted when the gaseous colloid is periodically cleared and a visual measurement (e.g., image) is sampled. However, the virtual representation can be otherwise generated.

The VOMS 600 can optionally include a condensation management system (CSM), which functions to minimize or eliminate dispersion material condensation on the camera lens. The CSM can be used continuously, during wet operation, before dry operation, or at any suitable time. In one variation, the CSM is used during wet operation, before an image of the cavity is sampled by the optical system. In this variation, the CSM can be operated before, during or after temporarily vacating the gaseous colloid from the cavity. However, the CSM can be otherwise used.

In one variation, the CSM includes a hydrophobic or antistatic lens coating or lens material.

Figure 13:
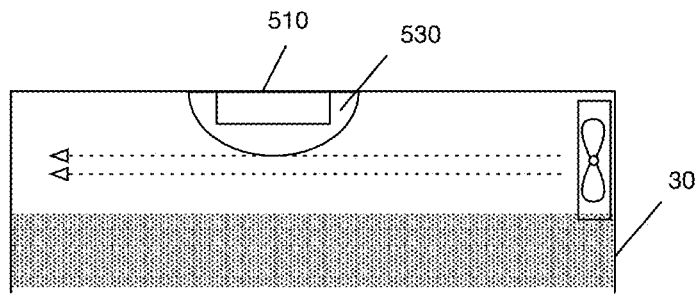
FIG. 13 is a first example of a condensation management system in operation.

In a second variation, example shown in FIG. 13, the CSM includes a convection element proximal the optical system (e.g., proximal the camera) that displaces the gaseous colloid away from the optical system's lens. The convection element is preferably directed perpendicular the camera's FOV (e.g., substantially parallel the lens), but can alternatively be directed toward the lens, toward the food, toward an opposing cavity surface, or otherwise arranged. In a first specific example, the convection element can include an air blade that forms a sheet of fluid (e.g., laminar air) parallel to the camera lens. In a second specific example, the convection element can include a blower that blows cavity fluid away from the lens.

In a third specific example, the convection element generates an air curtain extending between the cavity surface mounting the camera and the food or the opposing cavity surface (e.g., between the cavity ceiling and the cavity bottom; between the camera and the food; etc.). This can function to prevent high-humidity cavity fluid from ingressing into a region proximal the lens, and/or maintain a colloid-removed region (e.g., between opposing air curtains). The air curtain preferably includes laminar fluid flow (e.g., laminar air), but can alternatively or additionally include turbulent fluid flow. The air curtain preferably surrounds a portion of the food (e.g., does not intersect the food), but can alternatively or additionally: surround the entirety of the food, surround a portion of the food (e.g., intersect the food), or be otherwise configured. In this specific example, the convection elements can include blowers, flat nozzles, or any other suitable component. The nozzles are preferably mounted to the same surface as the optical system, but can alternatively be mounted to any other suitable cavity surface. The nozzles are preferably static, but can alternatively be actuatable (e.g., controlled by the processing system). The air speed can be static or be controlled based on the convection velocity, the gaseous colloid class, the food state, the food class, or any other suitable parameter. However, any other suitable convection element in any suitable configuration can be used.

In a third variation, the CSM includes a temperature matching system that substantially matches the lens temperature with the cavity temperature or gaseous colloid temperature. Substantially matching the temperatures can include: exactly matching the lens temperature, matching the temperature within a predetermined error range (e.g., of ±0.1° C., ±1° C., ±5° C., etc.), exceeding the cavity temperature (e.g., by a predetermined error range, such as that mentioned above), or otherwise matching the temperatures. The temperature matching system can be: the gaseous colloid itself, a heating element arranged proximal the lens (e.g., the cooking heating elements next to the camera; a second heating element located behind or next to the lens, etc.), heated liquid (e.g., dispersed material) flowing within the lens, wherein the liquid can have substantially the same index of refraction as the lens, or any other suitable temperature matching system. The temperature matching system can dynamically control lens temperature based on: a predetermined setpoint, the estimated gaseous colloid temperature, the real-time cavity temperature, passively controlled, or otherwise controlled.

Figure 14:
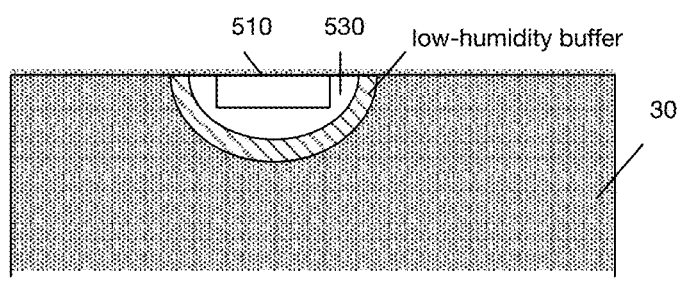
FIG. 14 is a second example of the visual obstruction management system in operation.
Figure 15:
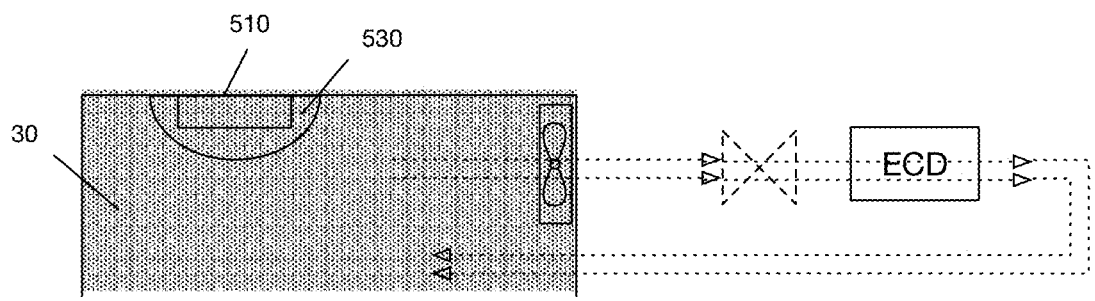
FIG. 15 is a third example of the visual obstruction management system in operation.
Figure 16:
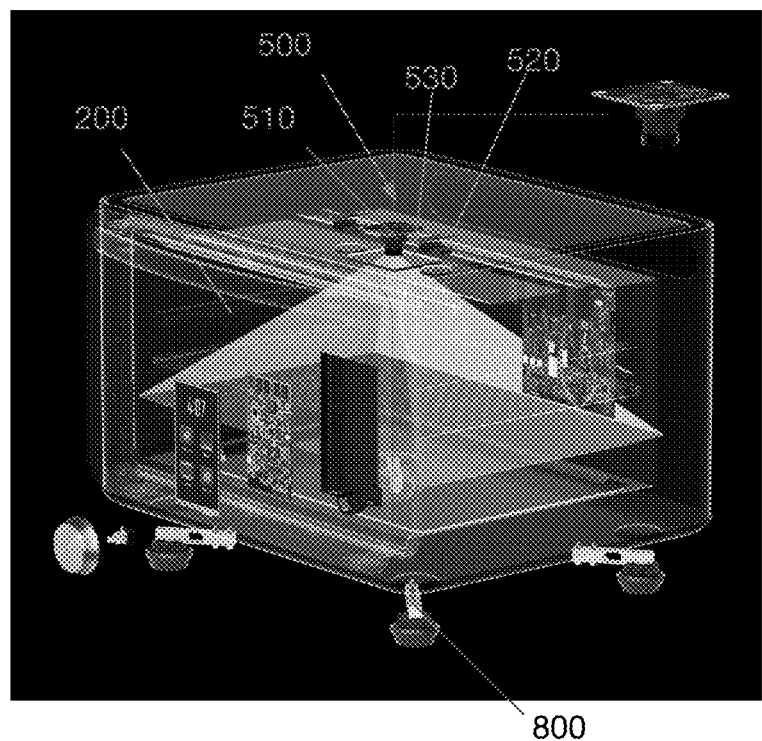
FIGS. 16 and 17 are schematic exploded representations of an example of the system.
Figure 17:
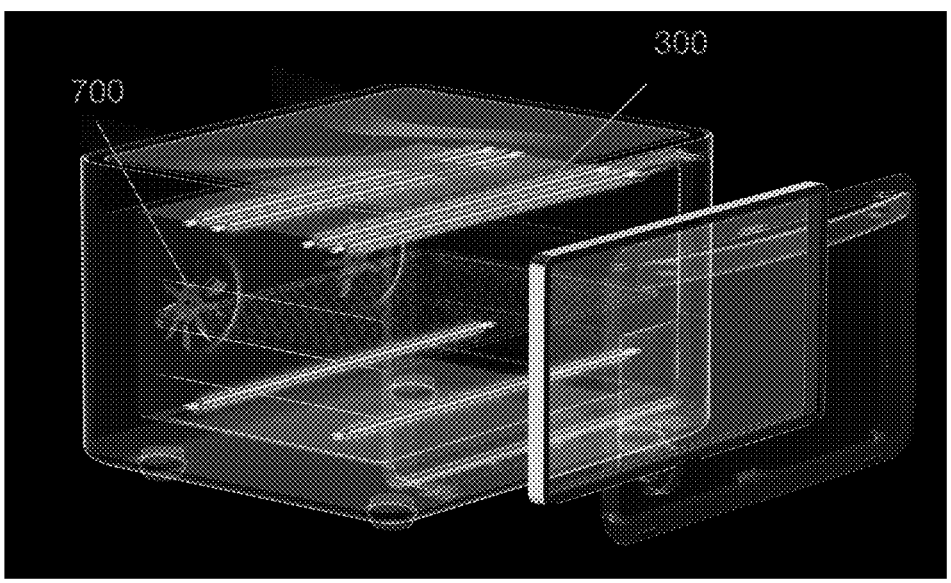

In a fourth variation, example shown in FIG. 14, the CSM includes a gap between the top interior panel and the camera lens, wherein the camera lens is recessed into the body top. In this variation, the top interior panel within the camera's FOV is preferably transparent, but can have any suitable property. In this variation, the transparent portion of the top interior panel can function as a secondary lens, not disperse or concentrate light rays, or have any suitable optical property. The gap (e.g., low-humidity buffer) can be filled with air (e.g., dry air), noble gas, be vacated (e.g., be a vacuum gap), or include any suitable component. In operation, the top interior panel temperature is substantially matched to the gaseous colloid temperature (e.g., using the temperature matching system), while the camera lens is maintained in a low-condensation environment (e.g., wherein the lens environment includes little to no condensate).

In a fifth variation, the CSM includes a lens wiper that can be automatically or manually operated. In a sixth variation, the CSM includes a shutter that protects the lens from condensate until the image is to be taken (e.g., the dispersed material condenses on the shutter instead of the lens). In this variation, the shutter can optionally include an absorbent material or wiper proximal the lens side, which can clear condensate from the lens when the shutter closes. However, the CSM can be otherwise configured.

The system 100 can optionally include an on-board processing system 900, which functions to operate the system components based on sensor feedback and/or operation instructions (e.g., pre-programmed instructions, user instructions, etc.). The processing system can optionally perform all or portions of the method (e.g., preprocessing the images, sampling the frames, etc.). The processing system can include a set of processors (e.g., CPU, GPU, ASIC, microprocessor); memory (e.g., Flash, RAM, etc.) that functions to store wireless configuration information (e.g., SSIDs, passwords, etc.), operating instructions, virtual models or representations, sensor data, and/or other data; or any other suitable set of instructions.

The system 100 can optionally include a communication system 920 that functions to communicate (e.g., transmit and/o receive) data. The communication system can communicate data over a local area network (LAN), wide area network (WAN), or over any suitable network. The communication system can be wired or wireless. The communication system preferably communicates data with one or more remote computing systems, but can alternatively communicate data with local systems (e.g., on-board sensors, etc.). The communication system can include: one or more chipsets or radios for WiFi, Bluetooth (e.g., classic, BLE, etc.), NFC, cellular, Zigbee, 802.11x protocol, or other protocol), or any other suitable computing system.

The system 100 can be used with (or include) a remote computing system 10 that functions to perform all or part of the method. The remote computing system can optionally: store food models (e.g., doneness models, food parameter determination models, etc.), cache or store cavity measurements, user data (e.g., user account information, user logins, API tokens issued to the user, etc.), and/or perform any other suitable function. The remote computing system can include: a remote server system, a user device (e.g., mobile device, smartphone, tablet, etc.), an auxiliary appliance (e.g., on the same LAN, associated with the same user or user account, etc.), or any other suitable system.

The system can optionally include or be used with an application 20 or client executing on one or more user devices. The application can be a native application, browser application, or any other suitable application. The application can function to: receive cavity measurements or food measurements (e.g., images of the food, video of the food, etc.) from the system (e.g., directly or indirectly, such as via a remote server system) and present said measurements to the user; receive operation instructions (e.g., cooking instructions) from the user and transmit said instructions to the system; or perform any other suitable functionality.

4. Method

As shown in FIG. 5, the method includes, during a colloid cooking period: cooking food with a gaseous colloid S100; and sampling a cavity measurement S200. The method can optionally include: minimizing the obstructive effect of the gaseous colloid on an in-situ optical system within the cavity; wherein the image is sampled while the obstructive effect of the gaseous colloid is minimized. The method can optionally include: recording a video of the cavity, wherein the image is a frame of the video; and streaming the video to a remote computing system. The method can optionally include: automatically controlling the system based on the image (e.g., automatically cooking food based on features extracted from the image). However, the method can be otherwise performed.

The method functions to record images or video of food cooking within the cavity during a visually-obstructed operation period (e.g., colloid cooking period). The images (or video) can subsequently be: streamed to the user (e.g., to enable the user to visually monitor the food during a cooking phase where monitoring has previously been impossible or discouraged); used to automatically monitor the food cooking progress (e.g., food state); and/or otherwise used.

The method is preferably entirely or partially performed by the system disclosed above, but can additionally or alternatively be performed by the optical system, a monitoring system (e.g., including at least the optical system, the wireless communication system, the processing system), the remote computing system(s), or by any other suitable system. In variants, the method can be performed by the system disclosed in U.S. application Ser. No. 16/008,478 and/or U.S. application Ser. No. 15/170,678, using portions of the methods disclosed therein.

The method is preferably performed automatically as part of a cooking session (such as cooking steps that use the flavor injector disclosed in U.S. application Ser. No. 16/008,478; before, after, and/or between dry cooking steps; etc.), but can alternatively or additionally be performed: upon receipt of manual instruction, upon occurrence of event (e.g., "start" selection), upon detection that the visual obstruction in the cameras has surpassed a predetermined threshold (e.g., 5%, 10%, 20%, 30%, 40%, 50%, 60%, 70%, 80%, 90%, etc.), upon determination that a gaseous colloid is present in the image (e.g., using brightness, color, motion, and/or other image features), or at any other suitable time. The cooking session can include dry operation steps, wet operation steps (e.g., colloid cooking steps), and/or any other suitable set of steps. All or portions of the method can be repeated during a cooking session, performed concurrently, performed serially, or performed in any other suitable relationship.

Cooking food during a colloid cooking period S100 functions to cook food using the gaseous colloid, during which a gaseous colloid is supplied into the cavity of a system. The colloid cooking period (colloid cooking step) is preferably part of the cooking session, but can alternatively be part of any other suitable set of operations. The colloid cooking period is preferably associated with a set of colloid cooking parameters, wherein each of the colloid cooking parameters can be associated with: a set of system outputs (e.g., heating elements, GCS, convection elements, etc.), a set of operation instructions for each of the system outputs, target colloid parameters (e.g., target colloid density, pressure, temperature, color, convection speed, convection pattern, etc.), a time period, and/or any other suitable set of instructions. The colloid cooking parameters can be predetermined, dynamically determined, or otherwise determined. In variants, the gaseous colloid can be cycled through the cavity and/or cyclicly used to cook the food (e.g., wherein the colloid cooking parameters can include increasing and decreasing the gaseous colloid density or distribution within the cooking cavity). S100 is preferably performed with the system (e.g., cooking appliance), more preferably controlled by the processing system, but can alternatively or additionally be performed or controlled by any other suitable system.

The properties of the gaseous colloid (colloid properties) within the cavity (e.g., cooking cavity, cooking chamber) can be: dynamically controlled, predetermined, passively set, or otherwise determined. The target colloid properties can be determined based on: the colloid, the food, the cavity, the airflow, the operation instructions (e.g., cooking instructions), or any other suitable system operation parameter, wherein different colloids can be associated with different system operation parameters. The target colloid property can be constant or variable during the colloid cooking period. The colloid properties can include: density (e.g., mass density, optical density, etc.), temperature, pressure, saturation, humidity, or any other suitable property.

The gaseous colloid can be at the boiling point for the liquid (e.g., 100° C. for water steam), superheated (e.g., steam hotter than 100° C.), cooled (e.g., steam cooler than 100° C.), heated to a predetermined temperature (e.g., for the food; for the colloid, such as between 40-120° C., 90° C. or less, between 225-250° C., etc.), or have any suitable temperature. The gaseous colloid can be at atmospheric pressure, pressurized above atmospheric pressure to a target pressure (e.g., to 5 PSI, 10 PSI, 15 PSI, etc.), or have any suitable pressure. The gaseous colloid can be fully saturated (e.g., have 100% humidity), partially saturated (e.g., have between 0% and 100% humidity), or have any other suitable humidity. The gaseous colloid can have a density (e.g., optical density, mass density): between 5 $m^2/kg$-200 $m^2/kg$; between 25 $m^2/kg$-100 $m^2/kg$; above, less than, or more than a predetermined colloid density (threshold colloid density; threshold amount of gaseous colloid), such as 10 $m^2/kg$, 25 $m^2/kg$, 50 $m^2/kg$, or any other suitable density; or have any suitable density.

Sampling a cavity measurement S200 functions to obtain a measurement of the food. The cavity measurement is preferably an optical measurement that can be supplied to the user and/or used to monitor food cooking progress, but can additionally or alternatively be any other suitable measurement. S200 is preferably performed with the in-situ optical system, but can be performed by any other suitable system. S200 can be performed: contemporaneously with the colloid cooking period (e.g., concurrently with the colloid cooking period, during the colloid cooking period, during a portion of the colloid cooking period, during a time window overlapping with the colloid cooking period, etc.); when the colloid is removed from a region within the cooking cavity; during a period of the colloid cooking period associated with high air velocity or high colloid velocity (e.g., calculated based on the colloid density, colloid optical density, above a predetermined velocity, such as 0.2 m/s, 0.3 m/s, 0.5 m/s; etc.); or at any other suitable time.

The image can be sampled: constantly, at a predetermined frame rate, upon occurrence of an event (e.g., when the cooking instructions are associated with a colloid removal event), or at any other suitable time. The frame rate, shutter speed, or other sampling parameter can be predetermined (e.g., 3 frames per second, higher than 3 fps, etc.) or determined (e.g., calculated, selected, etc.) based on: the colloid class (e.g., based on the kinematics of the colloid), the colloid velocity, the colloid density, the colloid temperature, and/or any other suitable parameter. The frame rate can be proportional to or indirectly related to the parameters. For example, the frame rate for faster-moving colloids can be less frequent than the frame rate for slower-moving colloids. In another example, the shutter speed for faster-moving colloids can be faster than the frame rate for slower-moving colloids. However, the frame rate can increase with colloid speed, the shutter speed can decrease with colloid speed, and/or any other suitable sampling parameter can be otherwise determined based on colloid properties.

The sampled image is preferably a single frame, but can alternatively be multiple frames (e.g., captured in a burst, etc.). Sampling the image can include: recording a video, wherein the image is a frame of the video; taking a burst, wherein the image is a frame from multiple exposures; taking a single image; taking a stereoimage; or otherwise sampling the image.

The colloid parameters during S200 are preferably controlled to satisfy a predetermined set of colloid parameters, but can alternatively not satisfy the predetermined set. For example, the colloid density is preferably less than a threshold colloid density (e.g., 10 $m^2/kg$, 25 $m^2/kg$, 50 $m^2/kg$), but can alternatively be more than a threshold colloid density (e.g., 10 $m^2/kg$, 25 $m^2/kg$, 50 $m^2/kg$, etc.), be within a colloid density range (e.g., between 10 $m^2/kg$-100 $m^2/kg$, or any range therein), or have any suitable density. have any suitable density. In another example, the colloid temperature can be within a predetermined temperature range (e.g., selected to minimize condensation while maintaining the desired cooking properties for the food).

S200 can optionally include partially or entirely removing the gaseous colloid from a region of the cavity S210. S210 can be performed while the image is being sampled, before image being sampled, temporarily, as part of the colloid cooking period, after colloid cooking period, and/or at any suitable time. The region can be a subportion of the cavity, be a specific subportion of the cavity (e.g., wherein the colloid is selectively removed from the region), be the entire cavity, or be any other suitable portion of the cavity. The region is preferably between the camera and the food, but can alternatively or additionally be proximal the food, be proximal the camera (e.g., be a predetermined region proximal the camera lens or cavity ceiling), or be any other suitable region.

In a first variation, S210 includes circulating the cavity fluid (e.g., including the gaseous colloid) through the emission control device. The cavity fluid egressing the emission control device can be vented to ambient, returned to the cavity, or otherwise managed. For example, the cavity fluid (e.g., effluent) can be circulated over the catalytic converter. In one embodiment, circulating the cavity fluid through the emission control device includes: selectively redirecting the convection flow (e.g., from a default flow path) through the ECD when the colloid is to be removed. In a second embodiment, the ECD is arranged within the default convection flow path. However, the cavity fluid can be otherwise passed through the ECD.

In a second variation, S210 includes blowing or sucking the cavity fluid out of the region.

In a third variation, S210 includes superheating the colloid. This variant can be particularly useful when the colloid (e.g., steam) is transparent when superheated. However, S210 can be otherwise performed.

S200 can optionally include maintaining a colloid density within the region below a colloid density of a remainder of the cavity. This can function to maintain an unobscured or less-obscured region for food imaging. In variants, maintaining the colloid density within the region below a colloid density of a remainder of the cavity includes: introducing an air curtain between the region and the remainder of the cavity, continuously blowing colloid away from the region, or otherwise maintaining the target colloid density within the region.

The method can optionally include transmitting the sampled image(s) to the remote computing system S300. S300 functions to send the image to the remote computing system, wherein the remote computing system can: route the image to an endpoint requesting the image (e.g., a user device); process the image (e.g., to determine food parameters and/or cavity parameters); store the image; and/or otherwise utilize the image. In a first example, the image is sent to a remote server system (e.g., via a WAN). In a second example, the image is sent to a user device (e.g., via a LAN or indirectly, via a remote server system). However, the image can be otherwise sent to any other suitable endpoint.

The image can be sent individually, as part of a time series of images (e.g., a video), sent with metadata (e.g., auxiliary measurements), and/or sent with any other suitable information. For example, the method can include: recording a video of the cavity, wherein the image is a frame of the video; and streaming the video to the remote computing system. When sent as a video, the frame rate of the streamed video can be lower than the sampling frame rate (e.g., wherein frames are selected, extrapolated, or otherwise determined from the sampled frames for transmission), be the same as the frame rate, or be otherwise related to the sampling frame rate. The image can be sent with the communication module (e.g., wired, wireless) but can be otherwise sent. The image can be transmitted in real- or near-real time, at a predetermined frequency (e.g., every 10 minutes), after the cooking session, upon receipt of a user request (e.g., from the application), or at any suitable time.

The method can optionally include processing the image. This can function to improve the food features that are subsequently extracted from the image, improve the aesthetics for a user, or confer any other suitable benefit. The image can be preprocessed (e.g., before transmission, before analysis, etc.), post-processed (e.g., before transmission, before analysis, etc.), or processed at any other suitable time. Processing the image can include: enhancement (e.g., contrast stretching, noise filtering, histogram modification, etc.), segmentation (e.g., foreground/background segmentation, watershed segmentation, etc.), feature extraction (e.g., line extraction, ridge extraction, edge extraction, corner extraction, blob extraction, point extraction, etc.), classification, or any other suitable processing. Examples of processing can include: segmenting the food and/or colloid from the background, improving the food and/or colloid contrast (e.g., sharpening edges, adjusting relative lighting, removing noise, etc.), darkening the background (e.g., identifying and removing bright spots; identifying pixels or image regions associated with bright elements, such as heating elements, and darkening or removing the identified pixels; etc.), and/or any other suitable process.

The method can optionally include cooking the food according to adjusted colloid cooking parameters S400. This functions to dynamically adjust the cavity parameters to achieve a desired food parameter (e.g., doneness, texture, moisture, crispiness, color, etc.). S400 can be performed: during S100, after S200, dynamically during a subsequent cooking session (e.g., having shared food parameters, such as food class, with the instantaneous cooking session), or at any other suitable time. S400 is preferably performed by the system, but can alternatively be performed by any other suitable system. S400 preferably includes: determining adjusted colloid cooking parameters S410; and controlling cooking apparatus according to adjusted colloid cooking parameters S420; but can additionally or alternatively include any other suitable process.

Determining adjusted colloid cooking parameters S410 functions to adjust the colloid cooking parameters to achieve a food parameter closer to a desired value. The adjusted colloid cooking parameters can be determined by the system, the remote computing system, the application, or by any other suitable system. S410 can be performed with gaseous colloid (e.g., more or less colloid than a threshold colloid density or mass, such as 10 $m^2$/kg or 25 $m^2$/kg) between the sensor (e.g., camera) and the food; while the colloid is vacated from a region between the sensor and the food; or with any other suitable colloid state. S410 can be performed by: the remote computing system, the system, a combination thereof, or by any other suitable system.

Figure 6:
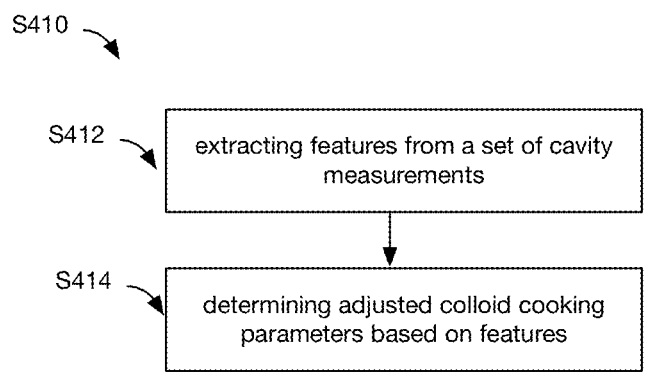
FIG. 6 is a schematic representation of a variation of determining adjusted colloid cooking parameters.

As shown in FIG. 6, S410 preferably includes: extracting one or more features from a set of cavity measurements S412 and determining adjusted colloid cooking parameters based on the features S414. However, S410 can be determined based on the amount of time that has passed, iteratively determined until a target food measurement or cavity measurement is met, or otherwise determined.

Extracting one or more features from a set of cavity measurements S412 functions to extract data points about the cavity and/or food. S412 can be performed by: the remote computing system, cooking appliance, a combination thereof, or by any other suitable system. Cavity measurements can include: images (e.g., color images, radar images, IR images, etc.), temperature, pressure, flow rate, or any other suitable measurement. Cavity measurements can include or encompass: food measurements, colloid measurements, or any other suitable measurement. The cavity measurements can be sampled by one or more of the sensors described above. The cavity measurements analyzed in S412 can be the same measurements as that transmitted in S300, or be a different set of images. The features can be extracted from: a single frame (e.g., single set of cavity measurements), multiple frames (e.g., multiple cavity measurements associated with multiple timeframes), a synthetic measurement (e.g., synthetic image), or from any other suitable data. The features can be extracted from: the entire frame, a portion of the frame associated with the food, or from any suitable portion of the frame.

The cavity measurements can be sampled or recorded: during the colloid cooking period, while the colloid is present within the cooking cavity (e.g., when the colloid is above, equal to, or below a threshold colloid parameter, such as the threshold colloid density); during the colloid cooking period, while the colloid is entirely or partially removed (e.g., to below the threshold colloid density) from the region between the sensor (e.g., camera) and the food; outside of the colloid cooking period; or at any other suitable time. In one example of sampling the image outside of the colloid cooking period, the image(s) can be sampled before the colloid cooking period, wherein measurements taken outside of the colloid cooking period can be used as reference images (e.g., to determine the extent of the food, to determine how much the food parameters have changed, etc.). In a second example of sampling the image outside of the colloid cooking period, the image(s) can be sampled after the colloid cooking period (e.g., to determine the food state, to calibrate the food state, to validate the food state estimation model, etc.).

Features that can be extracted from the cavity measurements include: color, size, weight, shape, texture, porosity, pore size, water content, exterior temperature, interior temperature, time series (e.g., changes over time, values over time), density, and/or any other suitable feature for: the cavity, the food, the colloid, the background, and/or any other suitable object within the cavity. The features can be extracted directly from one or more cooking cavity measurements; derived from cooking cavity measurements; or otherwise determined.

The features can be extracted using: edge detection, corner detection, blob detection, scale-invariant feature transform (SIFT), edge direction, changing intensity, autocorrelation, optical flow, motion detection, thresholding, template matching, Hough transform(s), deformable parameterized shapes, active contours, Gaussian detectors, pattern matching, Kalman filters, adaptive filters, FFT, peak analyzers, changepoint detectors, time frequency analyzers, and/or any other suitable feature extractor.

Determining the features can include: calculating the features using one or more equations (e.g., chained in parallel, in series), selecting the features from graph or chart, generating and analyzing a histogram (e.g., using HOG, intensity histograms, etc.), sensor fusion, determining the features using neural networks (e.g., trained on feature-to-food parameter data for the food class), or otherwise determined. In one example, the internal food temperature can be determined based on primary features (e.g., color, change in size/shape, etc.) and/or measured or expected cavity features (e.g., temperature, humidity, etc.) that are extracted from the cavity measurement.

S412 can optionally include: preprocessing the image(s), such as highlighting gray scale, applying color transformation, thresholding, filtering, or otherwise preprocessing the image. S412 can optionally include: segmenting the food portions out of the image (e.g., segmenting unobstructed or visible food from the image based on the color of each pixel and the neighboring pixels); segmenting the pixels or image region where the food is expected to be (e.g., wherein said image region can be determined from a reference image sampled when the colloid is vacated or has not be introduced into the cavity); or otherwise identifying the food within the image.

S412 can optionally include: extracting the features from the segmented food. Examples of food features that can be extracted or determined (e.g., derived, calculated, selected, etc.) include: color, shrinkage, size measurements, shape measurements (average diameter, short axis, long axis, perimeter), surface area, volume, pores, pore size, porosity (e.g., image enhancement, such as using CLAHE; pore segmentation; etc.), image texture (e.g., mean, variance, skewness, kurtosis), or any other suitable feature. The features can be extracted using edge detection, corner detection, blob detection, scale-invariant feature transform (SIFT), edge direction, changing intensity, autocorrelation, optical flow, motion detection, thresholding, template matching, Hough transform(s), deformable parameterized shapes, active contours, Gaussian detectors, or any other suitable image processing feature detector.

S412 can optionally include generating a synthetic image. The synthetic image is preferably determined from multiple images sampled within a predetermined timeframe, but can be extrapolated (e.g., in its entirety from two different images; partially, from adjacent pixel regions, etc.), or otherwise determined. The predetermined timeframe can be: a constant timeframe, such as less than 5 seconds, 30 seconds, 1 minute, etc.; determined based on the gaseous colloid velocity; determined based on the gaseous colloid type; determined based on the food class (e.g., shorter for fast-cooking or fast-changing foods, longer for slow-cooking or slow-changing foods); or otherwise determined.

In a first variation, generating the synthetic image can include: averaging multiple frames (e.g., raw or preprocessed).

In a second variation, generating the synthetic image can include: identifying unobstructed image regions from different frames; and stitching the unobstructed image regions into a synthetic image. The image regions can be: amorphic (e.g., include any region of the image unobstructed by colloid or obstructed by colloid less than a threshold obstruction amount), predetermined sizes (e.g., units in a grid), or otherwise structured. The image regions that are identified and/or stitched together can be: over the entire frame, subregions within an image region associated with the food (e.g., wherein the image region associated with the food can be identified from an unobstructed image, such as an image taken before the colloid cooking period), or located in any other suitable portion of the frame.

Figure 12:
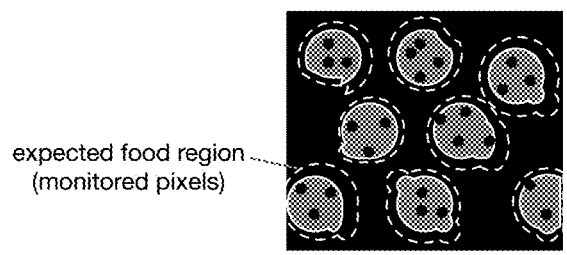
FIG. 12 is an example of identifying the image regions, expected to be associated with food, for monitoring.

Unobstructed image regions can be image regions wherein: the colloid visibility is less than a threshold visibility; wherein the food visibility is higher than a threshold visibility, such as higher than 40%, 50%, 60%, or 70%; the noise is less than a noise threshold, a visual food parameter (color, sharpness, noise) in the image region is within a predetermined range of a reference parameter (e.g., wherein the reference parameter can be the food parameter extracted from a frame taken before colloid injection, extracted from a frame taken when colloid density is less than a threshold colloid density, such as 10 $m^2$/kg, extracted from a global reference image; be a global reference parameter for the food; etc.); when a foreground is identifiable or segmentable from the background; when a visual food parameter improves beyond a threshold value from prior frames; the image was sampled after the colloid-removal mechanism was activated; the image region is of a cavity region where the colloid is expected to be removed (e.g., due to convection flow patterns, due to targeted colloid removal, etc.); the image region is of a cavity region where food is expected to be (e.g., based on an unobstructed image of the food; based on where the food boundaries are estimated to be based on the food expansion or contraction rates for the food class and/or cooking instructions, illustrative example shown in FIG. 12); or otherwise determined. The unobstructed image regions are preferably of portions of the food, but can alternatively be of portions of the colloid, cavity, or other object. In this variation, S414 can be applied after unobstructed image regions for a minimum proportion of the image area of interest (e.g., image region associated with the food) has been met (e.g., more than 40%, more than 50%, more than 60%, more than 80%, etc.), or applied at any other suitable time. In this variation, the missing image regions can be extrapolated or otherwise filled in.

Figure 11:
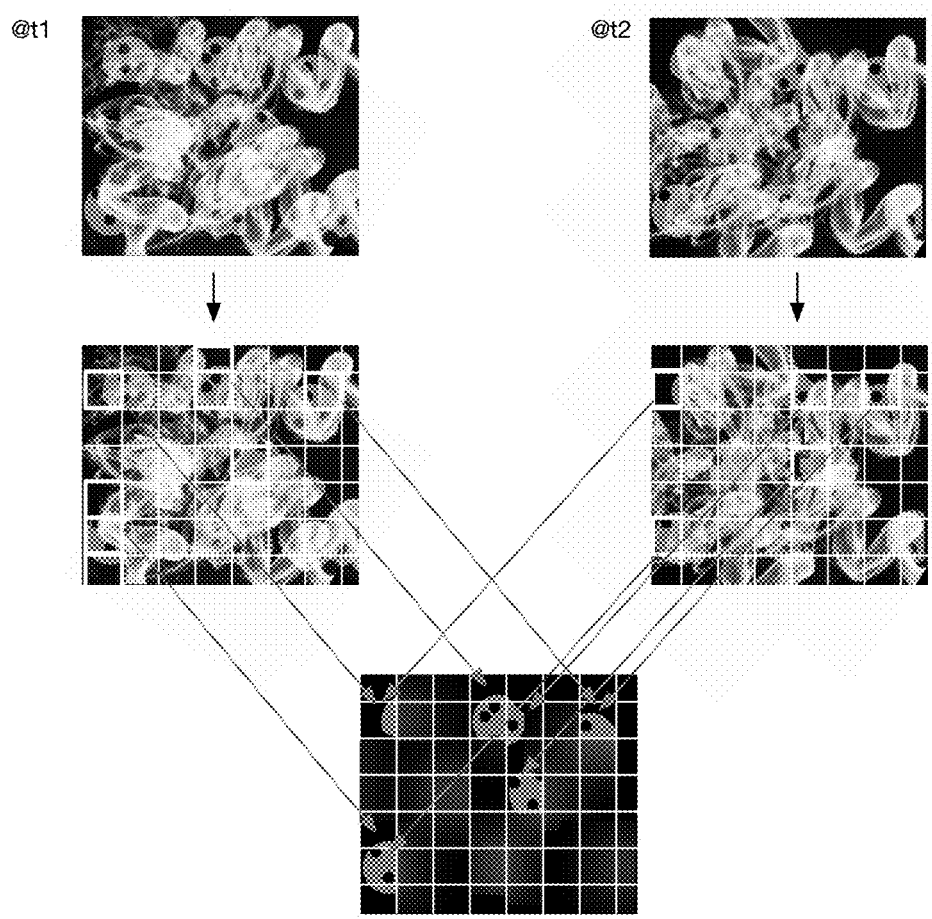
FIG. 11 is an example of generating the synthetic image.

In one example, the second variant can include: segmenting the food from the background and the colloid; identifying frame regions with food visibility higher than a visibility threshold from multiple frames; and stitching the identified frame regions together into the synthetic image (illustrative example shown in FIG. 11). In a second example, the second variant can include: determining frame regions (e.g., pixels) associated with food from an unobstructed image (illustrative example shown in FIG. 12), identifying the same frame regions (e.g., pixels) within one or more obstructed images of the food (e.g., sampled within the predetermined timeframe), and for each frame region, averaging the identified frame regions from the obstructed images. However, the synthetic image can be otherwise generated.

Extracting one or more features from a set of cavity measurements S412 can optionally include: determining a food parameter based on the extracted features. The food parameter can include: the internal food temperature, the external temperature, the food state (e.g. doneness), and/or any other suitable feature or food parameter. The food parameter can be determined (e.g., calculated, selected, matched, fitted, etc.) based on the extracted features, auxiliary measurements, or any other suitable data.

Alternatively or additionally, the features can be extracted from auxiliary sensor measurements during the colloid cooking process (e.g., when the optical sensor is handicapped or obscured). In a first variation, the method can include sampling the food's size and shape change using an IR sensor. In a second variation, the method can include determining internal temperature by using temperature probe or estimating the internal temperature based on a time series of historical internal temperatures for the cooking session.

Determining adjusted colloid cooking parameters based on the features S414 functions to determine updated cooking parameters to obtain the desired food parameter. S414 can be performed by: the remote computing system (e.g., wherein the remote computing system determines the adjusted cooking parameters and transmits the adjusted cooking parameters to the cooking appliance); the cooking appliance; a combination thereof; or any other suitable system.

Adjusted colloid cooking parameters can include: the colloid density (e.g., inject more if optical density is too low or the colloid is too thin; scrub the cavity fluid using the emission control device if the optical density is too high or the colloid is too thick); the colloid color (e.g., inject more colloid, adjust the oxygen supply to the colloid precursor, or adjust colloid precursor heating if colloid color is incorrect; increase airflow through colloid precursor heating if smoke color is white; etc.); colloid temperature (e.g., increase if not cooking fast enough, if internal temperature is lower than expected); the cavity temperature (and/or heating element power supply); the convection flow rate; the relative humidity; the amount of vapor within the cavity; the cavity pressure; the heat distribution; or any other suitable cooking parameter.

The adjusted colloid cooking parameters can be determined based on: the extracted features (e.g., extracted from the image(s)), the food parameter, the target food parameter (e.g., the expected food parameter), the difference between the determined food parameter and the target food parameter, the difference between the current cavity parameter and the target cavity parameter, or any other suitable information.

Determining the adjusted colloid cooking parameters can include: calculating the adjusted colloid cooking parameter (e.g., using one or more equations, chained in series or in parallel), selecting the parameter from a graph or chart, iteratively adjusting the parameter until a predetermined set of features of food parameter is met, randomly determining the parameter, or otherwise determining the parameter.

The adjusted colloid cooking parameters can be implemented in real- or near-real time (e.g., wherein the system outputs, such as the heating elements, the convection element, or other system outputs, are controlled to achieve the adjusted colloid cooking parameters), but can alternatively or additionally be stored and used to update the initial or target colloid cooking parameters for other cooking sessions (e.g., for the user or other users). However, the adjusted colloid cooking parameters can be otherwise used.

Embodiments and/or variants of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein. Embodiments and/or variants can be performed in combination or exclusively.

As a person skilled in the art will recognize from the previous detailed description and from the figures and claims, modifications and changes can be made to the preferred embodiments of the invention without departing from the scope of this invention defined in the following claims.

We claim:

1. A method for controlling a cooking appliance comprising a cooking chamber, wherein the method comprises:
    cooking, during a colloid cooking period and using a colloid within the cooking chamber, food according to a set of cooking parameters;
    minimizing an obstructive effect of the colloid on a camera optically connected to the cooking chamber by heating a lens of the camera to a temperature of the cooking chamber;
    sampling, using the camera optically connected to the cooking chamber, one or more images of the food;
    extracting a feature of the food from the one or more images; and
    dynamically adjusting, based on the feature, a first cooking parameter of the set of cooking parameters.

2. The method of claim 1, wherein the minimizing the obstructive effect of the colloid further comprises one or more of dispersing, condensing, or moving the colloid away from the food.

3. The method of claim 1, wherein the minimizing the obstructive effect of the colloid further comprises circulating the colloid away from a lens of the camera using a convection element.

4. The method of claim 1, further comprising:
segmenting the food from a background of the one or more images;
extracting the feature from the segmented food;
determining, based on the extracted feature, one or more parameters associated with the segmented food; and
determining, based on the one or more parameters, to adjust the first cooking parameter.

5. The method of claim 4, wherein the one or more parameters comprise at least one of:
an internal temperature of the food;
an external temperature of the food; or
a state of doneness of the food.

6. The method of claim 1, further comprising:
generating, using the one or more images, a synthetic image of the food, wherein the feature is extracted from the synthetic image.

7. The method of claim 1, wherein the colloid comprises at least one of:
an aerosol;
a mist;
steam; or
smoke.

8. The method of claim 1, wherein the first cooking parameter comprises one or more of:
a density of the colloid;
an airflow of the colloid;
a temperature of the colloid;
a temperature of the cooking chamber;
a convection flow rate;
a relative humidity,
an amount of vapor in the cooking chamber;
a pressure of the cooking chamber; or
a heat distribution.

9. The method of claim 1, wherein the camera may comprise one or more of:
a CCD camera;
a CMOS camera;
an infrared (IR) camera;
an ultraviolet (UV) camera;
a multispectral camera; or
a hyperspectral camera.

10. A cooking appliance comprising:
one or more processors;
a cooking chamber;
a camera optically connected to the cooking chamber; and
memory storing instructions that, when executed by the one or more processors, cause the cooking appliance to:
cook, during a colloid cooking period and using a colloid within the cooking chamber, food according to a set of cooking parameters;
minimize an obstructive effect of the colloid on the camera by heating a lens of the camera to a temperature of the cooking chamber;
sample, using the camera, one or more images of the food;
extract a feature of the food from the one or more images; and
dynamically adjust, based on the extracted feature, a first cooking parameter of the set of cooking parameters.

11. The cooking appliance of claim 10, wherein the instructions, when executed by the one or more processors, cause the cooking appliance to further minimize the obstructive effect of the colloid by dispersing, condensing, or moving the colloid away from the food.

12. The cooking appliance of claim 10, wherein the instructions, when executed by the one or more processors, cause the cooking appliance to further minimize the obstructive effect of the colloid by circulating the colloid away from a lens of the camera using a convection element.

13. The cooking appliance of claim 10, wherein the instructions, when executed by the one or more processors, cause the cooking appliance to:
segment the food from a background of the one or more images;
extract the feature from the segmented food;
determine, based on the extracted feature, one or more parameters associated with the segmented food; and
determine, based on the one or more parameters, to adjust the first cooking parameter.

14. The cooking appliance of claim 10, further comprising:
one or more sensors configured to obtain one or more second features of the food.

15. The cooking appliance of claim 14, wherein the instructions, when executed by the one or more processors, cause the cooking appliance to:
adjust the first cooking parameter based on the extracted feature and based on one or more second features of the food.

16. The cooking appliance of claim 10, further comprising:
a convection element configured to circulate the colloid during the colloid cooking period.

17. A system comprising:
a remote computing system; and
a cooking appliance configured to:
cook, during a colloid cooking period and using a colloid within a cooking chamber of the cooking appliance, food according to a set of cooking parameters;
minimize an obstructive effect of the colloid on a camera optically connected to the cooking chamber by heating a lens of the camera to a temperature of the cooking chamber;
sample, using the camera, one or more images of the food;
extract a feature of the food from the one or more images; and
dynamically adjust, based on the extracted feature, a first cooking parameter of the set of cooking parameters.

18. The system of claim 17, wherein the remote computing system is configured to control operation of the cooking appliance.

19. The system of claim 17, wherein the first cooking parameter is further adjusted based on input received from the remote computing system.

20. The system of claim 17, wherein the first cooking parameter comprises one or more of:
a density of the colloid;
an airflow of the colloid;
a temperature of the colloid;
a temperature of the cooking chamber;

a convection flow rate;
a relative humidity;
an amount of vapor in the cooking chamber;
a pressure of the cooking chamber; or
a heat distribution.

21. The system of claim 17, wherein the camera may comprise one or more of:
a CCD camera;
a CMOS camera;
an infrared (IR) camera;
an ultraviolet (UV) camera;
a multispectral camera; or
a hyperspectral camera.

\* \* \* \* \*